US010318696B1

(12) United States Patent
Yeung et al.

(10) Patent No.: US 10,318,696 B1
(45) Date of Patent: Jun. 11, 2019

(54) EFFICIENT TECHNIQUES FOR PROCESS VARIATION REDUCTION FOR STATIC TIMING ANALYSIS

(71) Applicant: Ampere Computing LLC, Santa Clara, CA (US)

(72) Inventors: Alfred Yeung, Fremont, CA (US); Subbayyan Venkatesan, San Jose, CA (US); Vamsi Srikantam, San Ramon, CA (US); Manoj Kulkarni, Pune (IN); Ojas Dharia, San Jose, CA (US)

(73) Assignee: AMPERE COMPUTING LLC, Santa Clara, CA (US)

( * ) Notice: Subject to any disclaimer, the term of this patent is extended or adjusted under 35 U.S.C. 154(b) by 85 days.

(21) Appl. No.: 15/149,249

(22) Filed: May 9, 2016

(51) Int. Cl.
*G06F 17/50* (2006.01)

(52) U.S. Cl.
CPC ...... *G06F 17/5081* (2013.01); *G06F 17/5009* (2013.01); *G06F 2217/84* (2013.01)

(58) Field of Classification Search
CPC ............ G11C 16/32; G11C 2029/5004; G11C 29/50004; G11C 29/023; G11C 5/063; G11C 5/147; G06F 11/008; G06F 11/073; G06F 11/076; G06F 11/079; G06F 11/0793; G06F 3/0625; G06F 3/0634; G06F 3/0653; G06F 19/00; G06F 2217/16; G06F 16/22; G06F 17/50; G06F 17/5036; G06F 17/5022; G06F 17/505; G06F 17/5081; G06F 17/13; G06F 17/5009; G06F 2217/78; G06F 17/5045; G06F 19/3456; G06F 11/261; G06F 13/4234; G06F 17/5027; G06F 17/5031; G06F 1/10; G06F 2217/06; H03K 19/17728; H03K 19/17736; H03K 19/1776; H03K 19/1778; G06N 3/10
USPC .................................................. 716/110–117
See application file for complete search history.

(56) References Cited

U.S. PATENT DOCUMENTS

| | | | |
|---|---|---|---|
| 8,407,640 | B2 | 3/2013 | Le et al. |
| 8,656,331 | B1 | 2/2014 | Sundareswaran et al. |
| 8,713,501 | B1 | 4/2014 | Le et al. |
| 8,806,413 | B2 | 8/2014 | Shaikh et al. |
| 8,843,864 | B2 | 9/2014 | Le et al. |
| 8,863,052 | B1 | 10/2014 | Dhuria et al. |
| 8,875,082 | B1 | 10/2014 | Sircar et al. |
| 9,183,333 | B2 | 11/2015 | Shebaita |
| 9,245,071 | B2 | 1/2016 | Katz et al. |
| 2013/0227510 | A1* | 8/2013 | Katz ................... G06F 17/5031 716/113 |

* cited by examiner

*Primary Examiner* — Binh C Tat
(74) *Attorney, Agent, or Firm* — Alston & Bird LLP

(57) ABSTRACT

Techniques efficiently improve circuit design to reduce its sensitivity to random device variation. A characterizer component can identify a subset of cells for an integrated circuit that can be representative of respective other cells of a set of cells. The characterizer component can analyze the representative cells of the subset to generate a variation profile, and can map the representative cells to physical cells used in the design of the circuit. A cell library comprising cells that are usable, have limited usage, and/or have general usage can be generated based on analysis results from the mapped cells. The circuit can be reconstructed based on the list of available cells using the cell library. The reconstructed circuit can be analyzed, and in case of a cell(s) violating a constraint, the cell(s) can be modified or enhanced to achieve target performance criteria.

20 Claims, 12 Drawing Sheets

US 10,318,696 B1

EFFICIENT TECHNIQUES FOR PROCESS VARIATION REDUCTION FOR STATIC TIMING ANALYSIS

TECHNICAL FIELD

The subject disclosure relates generally to integrated circuit design, e.g., to efficient techniques for process variation reduction for static timing analysis.

BACKGROUND

Conventional methods for improving timing of a circuit design can involve corner-based analysis through static timing, or can take into account process variation and can consider statistical properties of underlying cells in the circuit design, for example. However, conventional methods can be inefficient. For instance, conventional methods that can involve corner-based analysis through static timing can be inefficient, in part, because they do not take process variation into account. Other conventional methods, which can take into account process variation and can consider statistical properties of underlying cells in the circuit design, can be inefficient, for example, due to employing undue amounts of pessimism with regard to the circuit design and/or using an undesirable amount of time to generate cell-related information in connection with a circuit design.

The above-described description is merely intended to provide a contextual overview of current methods associated with integrated circuit design and is not intended to be exhaustive.

SUMMARY

The following presents a simplified summary in order to provide a basic understanding of some aspects described herein. This summary is not an extensive overview of the disclosed subject matter. It is intended to neither identify key nor critical elements of the disclosure nor delineate the scope thereof. Its sole purpose is to present some concepts in a simplified form as a prelude to the more detailed description that is presented later.

Conventional methods for constructing an integrated circuit design can be inefficient, as some conventional methods, which can involve corner-based analysis through static timing, do not take process variation into account, and other conventional methods, which can take into account process variation and can consider statistical properties of underlying cells in the circuit design, typically end up employing undue amounts of pessimism with regard to the circuit design and/or use an undesirable (e.g., unnecessarily large) amount of information related to a cell, and correspondingly, using an undesirable (e.g., unnecessarily large) amount of time to generate cell-related information in connection with an integrated circuit design. In an effort to overcome these and/or other deficiencies, in an example embodiment, disclosed herein is a system that contains a characterizer component that identifies a subset of cells of a set of cells as representative cells that respectively represent subsets of other cells of the set of cells and characterizes the representative cells of the subset of cells, based at least in part on defined design criteria, wherein the set of cells is associated with a design of an integrated circuit. The system also can contain a mapper component that associates respective sets of cell-related information associated with the representative cells with the subsets of other cells.

In another example embodiment, disclosed herein is a method that comprises identifying, by a system comprising a processor, a subset of cells of a set of cells as representative cells that respectively represent subsets of other cells of the set of cells, based at least in part on defined design criteria, wherein the set of cells is associated with an integrated circuit design. The method also can involve characterizing, by the system, the representative cells of the subset of cells, based at least in part on the defined design criteria. The method further can involve mapping, by the system, respective sets of cell-related data associated with the representative cells with the subsets of other cells.

In yet another example embodiment, disclosed herein is a device that contains a characterizer component that determines a subset of cells of a set of cells to be representative cells that respectively represent subsets of other cells of the set of cells and characterizes the representative cells, in accordance with defined design criteria. The system also can contain a mapper component that maps respective sets of cell-related information associated with the representative cells to the subsets of other cells. The system further can contain a cell library component that comprises at least one of categorization information that categorizes the representative cells, the cell-related information associated with the representative cells, or mapping information related to the mapping of the respective sets of cell-related information associated with the representative cells to the subsets of other cells. The system also can contain a constructor component that reconstructs the design of the integrated circuit based at least in part on a portion of the cells in the cell library component, based at least in part on subsets of the categorization information respectively associated with the representative cells, wherein the constructor component modifies a cell of the portion of the cells to enhance performance of the cell, based at least in part on an analysis result and a set of conditions associated with the cell, in accordance with the defined design criteria.

The following description and the annexed drawings set forth in detail certain illustrative aspects of the subject disclosure. These aspects are indicative, however, of but a few of the various ways in which the principles of various disclosed aspects can be employed and the disclosure is intended to include all such aspects and their equivalents. Other advantages and novel features will become apparent from the following detailed description when considered in conjunction with the drawings.

DETAILED DESCRIPTION

Figure 1:
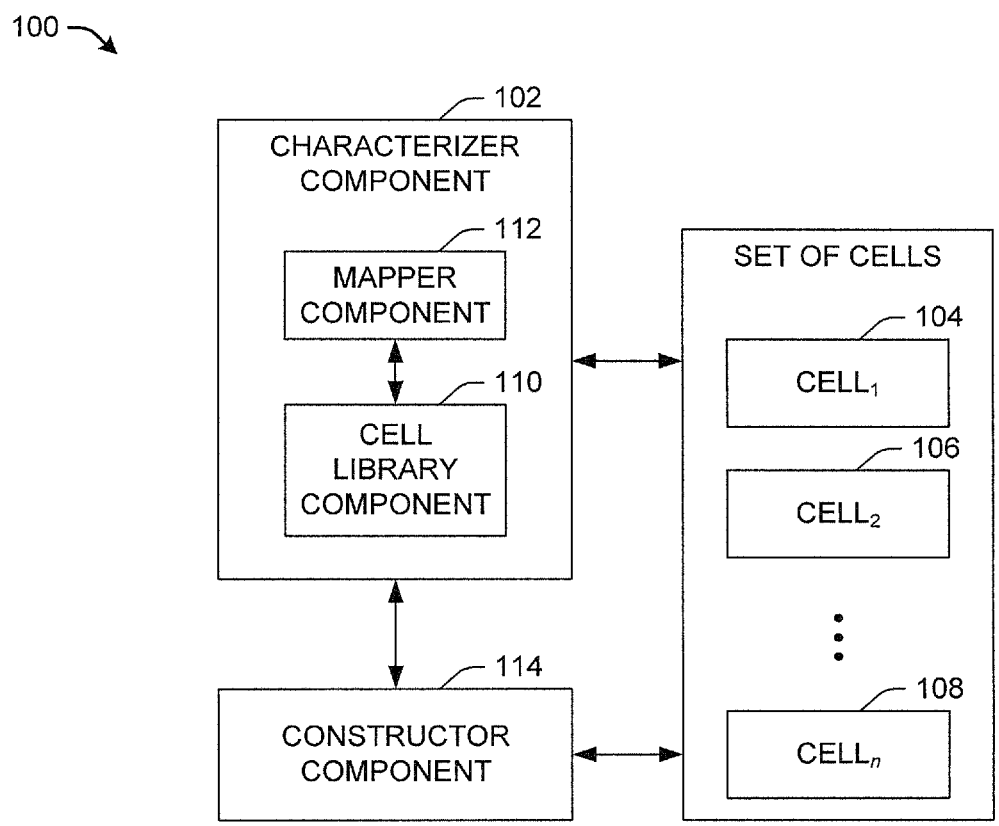
FIG. 1 illustrates a diagram of an example, non-limiting system that can efficiently characterize cells to facilitate improving an integrated circuit design, in accordance with various aspects and embodiments of the disclosed subject matter.

The disclosure herein is described with reference to the drawings, wherein like reference numerals are used to refer to like elements throughout. In the following description, for purposes of explanation, numerous specific details are set forth in order to provide a thorough understanding of the disclosed subject matter. It may be evident, however, that various disclosed aspects can be practiced without these specific details. In other instances, well-known structures and devices are shown in block diagram form in order to facilitate describing the disclosed subject matter.

One conventional method employed to improve the timing of a particular circuit design can involve a corner-based analysis through static timing. The circuit design can be improved around a particular pre-defined process-voltage-temperature (PVT) "corner" with a target clock period. This method can work adequately on certain designs, but it does not take into account for process variation.

Another conventional method can consider process variation by applying a generic on-chip-variation (OCV) margin to the circuit design to improve the circuit design. It can consider the statistical properties of underlying cells in the circuit design. This method can add to the target clock period without necessarily examining the construction of the circuit design. While it may help achieve a slightly improved correlation in silicon than without applying this margin, the circuit design may not be necessarily optimized or desirably improved.

Still another conventional method for margining in connection with circuit design is known as advanced on-chip-variation (AOCV) margining. This method can consider statistical properties of underlying cells in the circuit design, as well as the circuit design, to determine an amount of margining and its methods of improving the target. While, in theory, this AOCV method can improve the circuit design, the implementation of this AOCV method in CAD tools, however, can lead to large and/or unduly unnecessary amounts of pessimism with respect to the circuit design. This associated pessimism can render this AOCV method undesirably ineffective for improvement or optimization of the circuit design.

Yet another conventional method for margining in connection with circuit design is known as parametric on-chip-variation (POCV) margining. This method can consider the statistical properties of underlying cells in the circuit design and can apply it on a per cell basis to the circuit design, for improvement of the circuit design. The POCV method can be somewhat useful to improve a circuit design, however, for the POCV method, an undesirable (e.g., tremendous or unnecessarily large) amount of information related to a cell typically is used in order to achieve the circuit design. The amount of time required to generate the needed cell-related information (e.g., the undesirably large amount of cell-related information) can make this POCV method undesirably inefficient.

Techniques that can efficiently improve circuit design to reduce its sensitivity to random device variation are presented. In connection with designing an integrated circuit, a characterizer component can identify a subset of cells that can be representative of respective other cells of a set of cells. The characterizer component can analyze the representative cells of the subset, and can characterize the representative cells and generate a variation profile for the representative cells based at least in part on the results of the analysis and the application of design, construction, and simulation criteria relating to the cells in the analysis. The characterizer component can map the representative cells to the other available cells (e.g., physical cells) of the set of cells that can be used in the design of the circuit. For example, with regard to each representative cell, the characterizer component can map characterization information, which can characterize the representative cell, of the representative cell to another subset of cells that have same or similar attributes as the representative cell. Based at least in part on the analysis results and the cell mapping, the characterizer component can categorize cells, for example, as an unusable cell, a cell that can have limited or conditional usage (e.g., the cell is usable for a certain range of use), or a cell (e.g., general usage cell) that can be generally usable as part of the integrated circuit design. The characterizer component can generate a cell library that can comprise information regarding the unusable cells, cells having limited usage, and general usage cells.

A constructor component, which can comprise a place-and-route (P&R) engine, for example. The constructor component can reconstruct the integrated circuit based at least in part on the list of available cells using the information in the cell library. The constructor component can analyze the reconstructed integrated circuit to facilitate determining whether the respective cells in the circuit satisfy (e.g., meet) applicable design constraints, in accordance with defined design criteria. Based at least in part on the results of that analysis, the constructor component can identify or determine whether a cell satisfies or violates an applicable design constraint. If the constructor component determines that a cell violates a design constraint, the constructor component can modify the cell to enhance the attributes and/or performance of the cell, so that the cell satisfies the design constraint, to achieve target performance criteria for the cell.

These and other aspects and implementations of the disclosed subject matter will now be described in connection with the figures.

FIG. 1 illustrates a diagram of an example, non-limiting system 100 that can efficiently characterize cells to facilitate improving an integrated circuit design, in accordance with various aspects and embodiments of the disclosed subject matter. For instance, the system 100 can efficiently improve circuit design to reduce sensitivity of the integrated circuit to random device variation. The system 100 and techniques disclosed herein can be employed, for example, with very-large-scale integration (VLSI) processes to efficiently design and create integrated circuits.

In connection with designing an integrated circuit, various types of cells can be employed to perform various functions of the integrated circuit, wherein respective cells can have respective characteristics (e.g., physical or logical characteristics or attributes). A cell(s) can be, can comprise, or can be part of electronic elements of an integrated circuit, wherein the electronic elements can comprise, for example, logic gates (e.g., AND gate, NAND gate, OR gate, NOR gate, XOR gate, XNOR gate, inverter gate, AND-OR-Invert gate, or other type of gate), multiplexer (MUX), demultiplexer (DEMUX), an adder component, a storage element (e.g., a flip-flop or latch element), etc.

The system 100 can comprise a characterizer component 102 that can be employed to characterize cells to facilitate improving an integrated circuit design, in accordance with various aspects and embodiments of the disclosed subject matter. The characterizer component 102 can analyze a set of cells, which can comprise $cell_1$ 104, $cell_2$ 106, up through $cell_n$ 108, wherein n can be virtually any desired integer number. In connection with designing an integrated circuit, the characterizer component 102 can analyze the set of cells, for instance, by analyzing and identifying respective characteristics (e.g., physical or logical characteristics or attributes) of the respective cells. The characteristics of the cells can comprise, for example, height of a cell, channel width of a cell, voltage threshold (vt) doping of a cell, stack height of a cell, and/or other desired cell characteristics.

Based at least in part on the results of the analysis of the cells, the characterizer component 102 can identify a subset of cells (e.g., $cell_1$ 104, $cell_2$ 106, $cell_n$ 108) of the set of cells that can be representative cells that can be representative of respective other cells of the set of cells. The number of representative cells in the subset of cells can be relatively small (e.g., 40, 50, or some other relatively smaller number of representative cells), as compared to the number of cells in the set of cells (e.g., 10,000, 11,000, or some other larger number of cells in the overall cell set), for example. The characterizer component 102 can determine that a cell can be a representative cell that can be representative of a subset of other cells in the set of cells, in response to determining that the representative cell has the same or sufficiently (e.g., substantially) similar characteristics as the other cells in the subset of other cells, including analyzing random device variation associated with the cells (e.g., based on how a cell reacts to random device variation), and in accordance with defined design criteria relating to the design of the integrated circuit. For example, the characterizer component 102 can determine that a cell can be a representative cell that can be representative of other cells in the subset of other cells, in response to determining that the height of the representative cell is the same as or sufficiently similar to (e.g., within a defined acceptable difference in relation to) the height of the other cells in the subset of other cells, the channel width of the representative cell is the same as or sufficiently similar to (e.g., within a defined acceptable difference in relation to) the channel width of the other cells in the subset of other cells, the vt doping of the representative cell is the same as or sufficiently similar to (e.g., within a defined acceptable difference in relation to an amount of) the vt doping of the other cells in the subset of other cells, and/or the stack height of the representative cell is the same as or sufficiently similar to (e.g., within a defined acceptable difference in relation to) the stack height of the other cells in the subset of other cells, etc., in accordance with defined design criteria relating to the design of the integrated circuit. A cell that can be useful and used as a representative cell with regard to one type of integrated circuit, in accordance with the design criteria associated with that integrated circuit, may not be useful or used as a representative cell with regard to another type of integrated circuit, in accordance with the applicable design criteria associated with that other type of integrated circuit.

The characterizer component 102 can analyze the representative cells (e.g., $cell_1$ 104, $cell_2$ 106, $cell_n$ 108) of the subset, wherein the characterizer component 102 can apply design, construction, and/or simulation criteria in connection with the analysis of the representative cells. The characterizer component 102 can characterize the representative cells and generate a variation profile for the representative cells based at least in part on the results of the analysis and the application of design, construction, and/or simulation criteria relating to the cells in the analysis. The construction criteria can comprise, for example, the input transition rate for a cell, an output loading associated with a cell, and/or a transition rate for a cell, wherein the characterizer component 102 can determine or calculate for example, the input transition rate for a cell, an output loading associated with a cell, and/or a transition rate for a cell. The simulation criteria can comprise, for example, the process, voltage, and/or temperature of or associated with a cell, wherein the characterizer component 102 can determine or calculate for example, the process, voltage, and/or temperature of or associated with a cell. The variation profile of the representative cells can comprise information relating to, for example, the process variation associated with the representative cells (e.g., the variations in characteristics of the respective representative cells, the variations in how the respective representative cells react under certain conditions).

In some implementations, to facilitate generating the variation profile and/or in addition to generating the variation profile, the characterizer component 102 can simulate the characteristics, structure, and operation of a cell (e.g., a representative cell), based at least in part on the design, construction, and/or simulation criteria relating to the cell. The characterizer component 102 can obtain or generate (e.g., capture) simulation information relating to the results of the simulation of the characteristics, structure, and operation of the cell, wherein the simulation information can comprise simulated results of the mean (e.g., mean amount) of delay, the standard deviation of the delay, the mean (e.g., mean amount) of the output transition rate, and standard deviation of the output transition rate, or other simulation statistics relating to the simulation of the operation of the cell. In some implementations, with regard to each representative cell, the characterizer component 102 can analyze the simulation information (e.g., simulation results), and, based at least in part on the results of the analysis, can determine (e.g., calculate) or identify a ratio of a standard deviation to delay and a ratio of a standard deviation to a clock period for the cell. Based at least in part on the results of the cell simulation and analysis, the characterizer component 102 can generate design-based information and cell-based information relating to the integrated circuit design and the respective representative cells. The design-based information can provide an indication and/or guidance regarding the useful limitation, if any, of a representative cell, based at least in part on the mean delay (e.g., mean amount of delay) and transition rate of the representative cell, and can provide a general indication and/or general guidance with regard to the overall integrated circuit design to facilitate limiting variation exposure in the integrated circuit design.

Based at least in part on the analysis results and the cell-based information, the characterizer component 102 can categorize (e.g., classify) the cells (e.g., representative cells 104 through 108) of the subset of cells, for example, as either an unusable cell, a cell (e.g., a limited usage cell) that can have limited or conditional usage, or a cell (e.g., a general use cell) that is able to be used for general usage, in connection with the design of the integrated circuit. The characterizer component 102 can determine that a cell (e.g., representative cell) is an unusable cell, for example, in response to determining that the cell is not suitable for use in the integrated circuit, based at least in part on cell-based information associated with that cell (e.g., information relating to characteristics of the cell, analysis or simulation results relating to the cell), in accordance with the defined design criteria. The characterizer component 102 can determine that a particular cell is a limited usage cell (e.g., a cell that can have limited or conditional use), for example, in response to determining that the particular cell is usable under certain circumstances with regard to the integrated circuit design, but is not suitable for use under certain other circumstances with regard to the integrated circuit design, based at least in part on cell-based information associated with that particular cell (e.g., information relating to characteristics of that particular cell, analysis or simulation results relating to that particular cell), in accordance with the defined design criteria. For a cell categorized as a limited or conditional usage cell, the characterizer component 102 can determine and specify a minimum criteria and/or a maximum criteria (e.g., a range of permissible use) that is/are to be satisfied in order for it to be permissible to use the limited or conditional usage cell, in accordance with the defined design criteria. The characterizer component 102 can determine that a cell is a general use cell (e.g., a cell that can generally be used in the construction of the integrated circuit), for example, in response to determining that the cell is generally able to be used without limitation in the construction of the integrated circuit, based at least in part on cell-based information associated with that cell (e.g., information relating to characteristics of that cell, analysis or simulation results relating to that cell), in accordance with the defined design criteria. The characterizer component 102 can generate a cell library component 110 (e.g., annotated cell library) that can comprise information regarding the unusable cells, cells having limited usage, and cells that can have general usage, based at least in part on the categorization (e.g., classification) of the representative cells (e.g., cell$_1$ 104, cell$_2$ 106, cell$_n$ 108) of the subset of cells.

The characterizer component 102 can comprise a mapper component 112 that can map the representative cells (e.g., cell$_1$ 104, cell$_2$ 106, cell$_n$ 108) to the other available cells (e.g., physical cells) of the set of cells that can be used in the design of the integrated circuit. For example, with regard to each representative cell, the mapper component 112 can map cell-related information, including characterization-related information (e.g., which can indicate a characterization), of the representative cell, to a subset of other cells that have same or similar attributes as the representative cell. The characterizer component 102 or mapper component 112 also can store information relating to such other cells (e.g., mapping information and/or information relating to the representative cell to which the other cells are mapped) in the cell library component 110.

For instance, if the characterizer component 102 has characterized a particular representative cell as a cell that can have general usage, the mapper component 112 can map information relating to the representative cell, including cell-related information, such as characteristic-related information and categorization-related information relating to the representative cell, to the other cells of the subset of other cells that are represented by the representative cell, wherein the categorization-related information can indicate that the representative cell and thus the other cells of associated subset of other cells represented by that representative cell can be cells of general usage with respect to the integrated circuit design, in accordance with the defined design criteria. Also, if the characterizer component 102 has characterized a particular representative cell as a cell that can have limited usage, the mapper component 112 can map information relating to that representative cell having limited usage, including cell-related information, such as characteristic-related information and categorization-related information relating to that representative cell, to the other cells of the subset of other cells that are represented by such representative cell, wherein the categorization-related information can indicate that the representative cell and thus the other cells of the associated subset of other cells represented by that representative cell can be cells of limited usage with respect to the integrated circuit design, in accordance with the defined design criteria. Further, if the characterizer component 102 has characterized a particular representative cell as a cell that can be unusable with respect to the integrated circuit design, the mapper component 112 can map information relating to such unusable representative cell, including cell-related information, such as characteristic-related information and categorization-related information relating to that unusable representative cell, to the other cells of the subset of other cells that are represented by such representative cell, wherein the categorization-related information can indicate that the representative cell and thus the other cells of the associated subset of other cells represented by that representative cell can be cells that can be unusable with respect to the integrated circuit design, in accordance with the defined design criteria.

Figure 2:
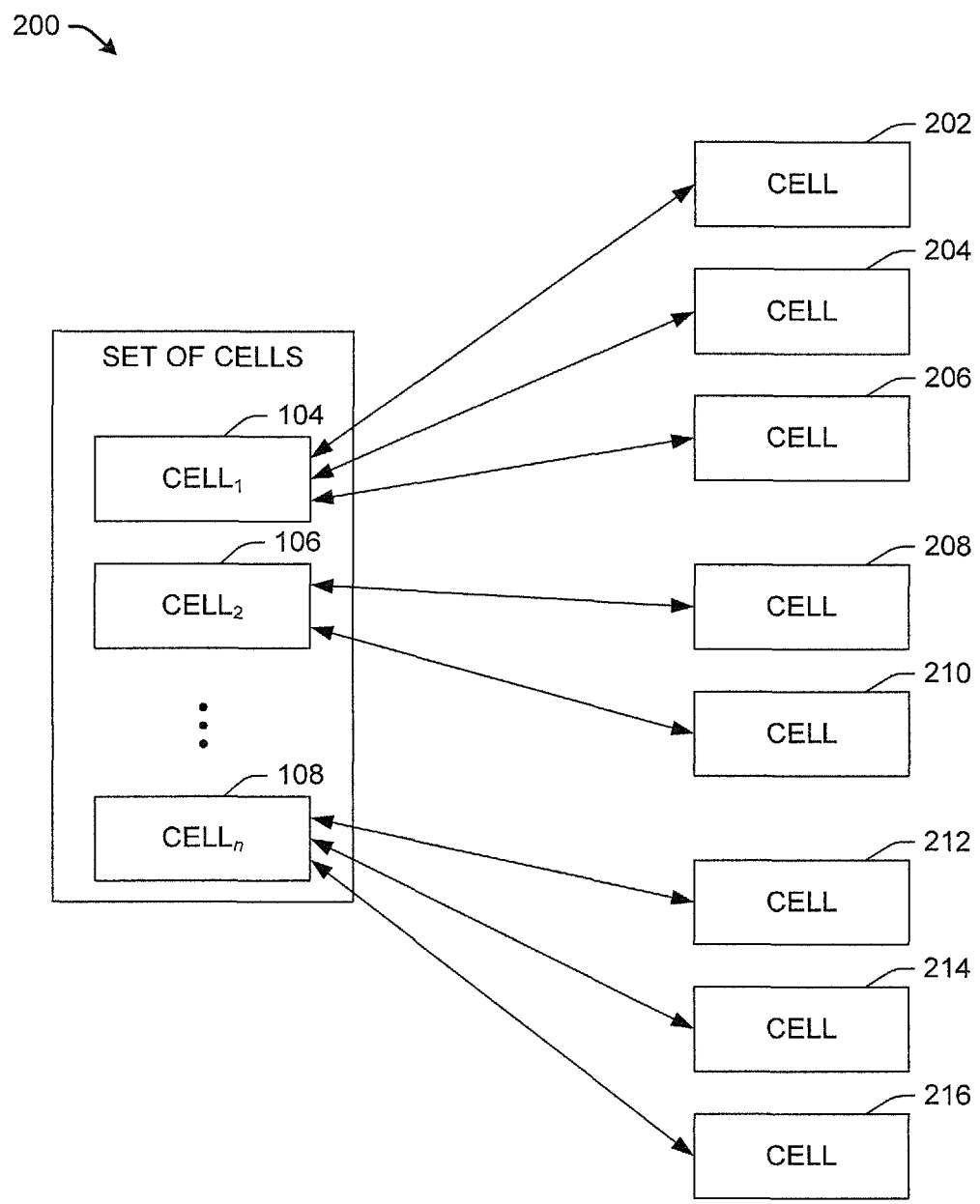
FIG. 2 depicts a diagram of an example mapping of representative cells to respective other cells of a set of cells associated with an integrated circuit design, in accordance with various aspects and embodiments of the disclosed subject matter.

Referring to FIG. 2 (along with FIG. 1), FIG. 2 depicts a diagram of an example mapping 200 of representative cells to respective other cells of a set of cells associated with an integrated circuit design, in accordance with various aspects and embodiments of the disclosed subject matter. The mapper component 112 can, for example, generate the mapping 200, based at least in part on the characterization of the representative cells, results of the analysis and/or simulation of the representative cells, and/or the results of the analysis of the set of cells, wherein, based at least in part on the results of the analysis of the set of cells, with regard to each representative cell, the characterizer component 102 or mapper component 112 can identify one or more other cells of the set of cells that can be the same as or similar to (e.g., sufficiently similar to) the representative cell such that the representative cell can be determined to be representative of the one or more other cells, in accordance with the defined design criteria.

For instance, as illustrated in the mapping 200, based at least in part on the characterization of the representative cells and the results of the analysis of the set of cells, the mapper component 112 can map $cell_1$ 104 (e.g., representative $cell_1$) (and can map information related to $cell_1$ 104) to cell 202, cell 204, and cell 206 of the set of cells, wherein the characterizer component 102 or mapper component 112 has determined that $cell_1$ 104 is representative of cells 202, 204, and 206; can map $cell_2$ 106 (e.g., representative $cell_2$) (and can map information related to $cell_2$ 106) to cell 208 and cell 210 of the set of cells, wherein the characterizer component 102 or mapper component 112 has determined that $cell_2$ 106 is representative of cells 208 and 210; and can map $cell_n$ 108 (e.g., representative $cell_n$) (and can map information related to $cell_n$ 108) to cell 212, cell 214, and cell 216 of the set of cells, wherein the characterizer component 102 or mapper component 112 has determined that $cell_n$ 108 is representative of cells 212, 214, and 216. Information relating to the mapped cells (e.g., cells 202 through 216) also can be included in the variation profile, as desired.

It is to be appreciated and understood that, while there three representative cells depicted in FIG. 2, the disclosed subject matter is not so limited, as the number of representative cells for a particular circuit design also can be more than three (e.g., 40, 50, or some other desired number of representative cells greater than three) or less than three, as desired, based on the design criteria associated with the particular circuit design. It also is to be appreciated and understood that, while, as shown in FIG. 2, three cells are mapped to the first representative cell, two cells are mapped to the second representative cell, and three cells are mapped to the third representative cell, the disclosed subject matter is not so limited, as, for a particular circuit design, the number of cells mapped to a particular representative cell can vary, based at least in part on the respective characteristics and functions of the cells to be used in the integrated circuit design, and the number of cells mapped to a particular representative cell can be more than three (e.g., 10, 50, 100, 500, 1000, or some other number of cells greater than three) or less than three, as desired, based on the design criteria associated with the particular circuit design.

Figure 3:
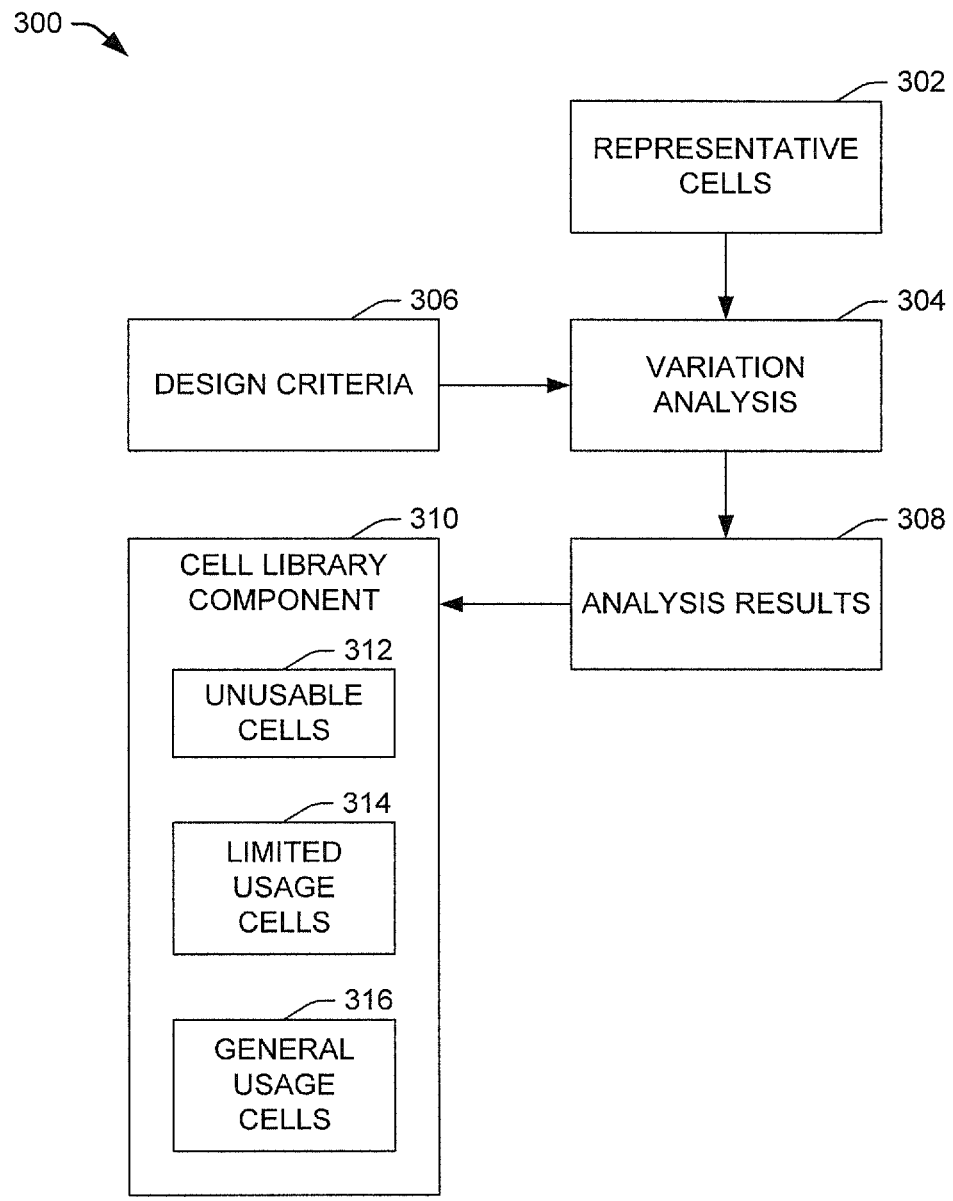
FIG. 3 presents a diagram of an example, non-limiting flow process that can be employed by the characterizer component during the cell characterization phase of the integrated circuit design process, in accordance with various aspects and embodiments of the disclosed subject matter.

Referring briefly to FIG. 3 (along with FIG. 1), FIG. 3 presents a diagram of an example, non-limiting flow process 300 that can be employed by the characterizer component 102 during the cell characterization phase of the integrated circuit design process, in accordance with various aspects and embodiments of the disclosed subject matter. As illustrated in the flow process 300, at reference numeral 302, the characterizer component 102 can identify the representative cells (e.g., $cell_1$ 104, $cell_2$ 106, $cell_n$ 108) of the set of cells that can be representative cells that can be representative of respective other cells of the set of cells. As shown at reference numeral 304, the characterizer component 102 can perform a variation analysis on the subset of cells (e.g., the representative cells), by applying the defined design criteria 306, as part of the variation analysis, to generate analysis results 308 that can identify respective characteristics and process variations of the respective representative cells, in accordance with the defined design criteria 306. The characterizer component 102 generate the cell library component 310 (e.g., annotated cell library), based at least in part on the analysis results 308. The cell library component 310 can comprise information regarding usable cells 312, limited usage cells 314, and general usage cells 316 (or unusable cells), for example, as the cells have been categorized by the characterizer component 102.

With further regard to FIG. 1, the system 100 also can comprise a constructor component 114, which can comprise a P&R engine, for example. The constructor component 114 can reconstruct the integrated circuit based at least in part on the list of available cells (e.g., truncated list of available cells that can include cells categorized as general usage and cells categorized as limited usage) and any additional design constraints that may be applicable to certain cells of the list of available cells, using the information regarding the cells contained in the cell library component 110. For instance, employing the P&R engine, the constructor component 114 can analyze the cell-related information, including respective cell characteristics information, cell categorization information, information in the variation profile, etc., contained in the cell library component 110, timing constraints associated with the integrated circuit design, design constraints associated with the integrated circuit design, a design netlist (e.g., information that can describe connectivity of an electronic circuit, terminals of electronic components, electrical conductors or connections between electronic components, etc.), and/or other information. Based at least in part on the results of such analysis, the constructor component 114 can reconstruct the integrated circuit by determining and implementing placement of the cells or other components (e.g., placement of electronic components, circuitry, and logic elements) in the circuit and by determining and implementing routing connections between the various cells or other components to achieve the desired functionality of the integrated circuit, in accordance with the defined design criteria. The constructor component 114 can structure the reconstruction of the integrated circuit based at least in part on the respective categorization (e.g., usable cell, limited usage cell, or general usage cell or unusable cell) of the cells in the cell library component 110. The constructor component 114 also can hide, eliminate, or mitigate low drive cells and/or tight slew limits associated with certain cells in connection with the reconstruction of the integrated circuit.

The constructor component 114 can analyze the reconstructed integrated circuit to facilitate determining whether the respective cells and other components in the circuit satisfy (e.g., meet) applicable design constraints, in accordance with defined design criteria. For example, the constructor component 114 can perform a timing analysis (e.g., static timing analysis) on the reconstructed integrated circuit. The constructor component 114 can evaluate the analysis results from the analysis performed on the reconstructed integrated circuit in connection with evaluating the additional limitations or conditions on certain cells (e.g., limited usage cells) used in the reconstructed integrated circuit. Based at least in part on the results of that analysis, the constructor component 114 can identify or determine whether a cell satisfies or violates an applicable design constraint. If the constructor component 114 determines that a cell violates a design constraint, the constructor component 114 can weigh the overall path associated with the cell and can further tier (e.g., adjust a tier level or value for) the overall path based at least in part on its path slack. With respect to a cell that is determined to violate a design constraint, if the constructor component 114 determines that such cell is in a critical tier, in accordance with a defined design criterion relating to defining the level of criticality of a cell or associated path, the constructor component 114 can modify one or more attributes or features of or associated with the cell to enhance (e.g., optimize) the attributes and/or performance of the cell (e.g., modify the cell to improve variation sensitivity associated with the cell), so that the cell can satisfy the design constraint(s), to achieve the target performance criteria for the cell, in accordance with the defined design criteria.

Figure 4:
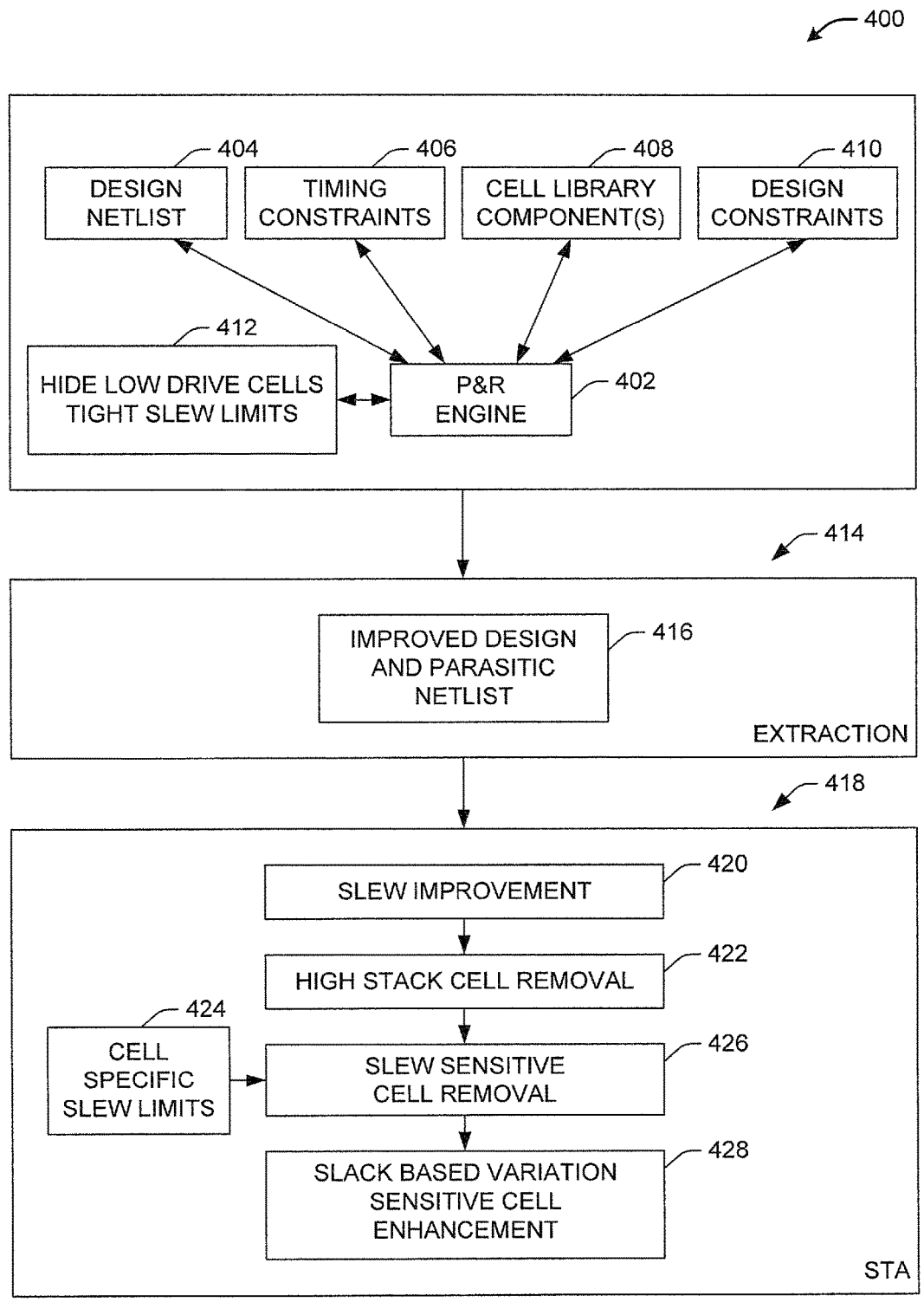
FIG. 4 depicts a diagram of an example, non-limiting flow process that can be employed by the constructor component to facilitate reconstruction and optimization of an integrated circuit design, in accordance with various aspects and embodiments of the disclosed subject matter.

Turning briefly to FIG. 4 (along with FIG. 1), FIG. 4 depicts a diagram of an example, non-limiting flow process 400 that can be employed by the constructor component 114 to facilitate reconstruction and optimization of an integrated circuit design, in accordance with various aspects and embodiments of the disclosed subject matter. As shown in the flow process 400, the P&R engine 402 (which can be part of or associated with the constructor component 114 can receive or access various types of information, such as, information from a design netlist 404, information regarding timing constraints 406, information from a cell library component(s) 408, and/or information regarding design constraints 410 associated with the integrated circuit design, among other information that the P&R engine 402 can receive (e.g., obtain) or access (e.g., from the characterizer component 102 or another component or data source). In connection with the integrated circuit design, the P&R engine 402 also can account for low drive cells and tight slew limits associated with certain cells, wherein it can, for example, hide, eliminate, or mitigate low drive cells and/or tight slew limits associated with certain cells 412 in connection with reconstruction of the integrated circuit by the P&R engine 402.

The P&R engine 402 can analyze the various types of information (e.g., information from a design netlist 404, information regarding timing constraints 406, information from a cell library component(s) 408, information regarding design constraints 410, information relating to low drive cells or tight slew limits 412, and/or other information). Based at least in part on the results of such analysis, the P&R engine 402 can reconstruct the integrated circuit by determining and implementing placement of the cells or other components (e.g., placement of electronic components, circuitry, and logic elements) in the circuit and by determining and implementing routing connections between the various cells or other components to achieve the desired functionality of the integrated circuit, in accordance with the defined design criteria.

The constructor component 114 can analyze the reconstructed integrated circuit to facilitate determining whether the respective cells and other components in the integrated circuit satisfy the applicable design constraints, in accordance with the defined design criteria. Based at least in part on the results of that analysis, with regard to the cells in the integrated circuit, the constructor component 114 can identify or determine whether a cell satisfies or violates an applicable design constraint, in accordance with the defined design criteria. If the constructor component 114 determines that a cell violates a design constraint, the constructor component 114 can modify one or more attributes of or associated with the cell to enhance the attributes and/or performance of the cell, so that the cell can satisfy the design constraint, to achieve the target performance criteria for the cell, in accordance with the defined design criteria.

In some implementations, to facilitate determining whether the respective cells and other components in the integrated circuit satisfy the applicable design constraints, the constructor component 114 can employ an extraction process 414 in connection with analyzing the reconstructed integrated circuit. For instance, the constructor component 114 can perform a parasitic extraction on the integrated circuit design and its elements and can determine and generate an improved (e.g., optimized) design and a parasitic netlist 416, which can comprise information relating to parasitic properties (e.g., undesirable or sub-optimal properties) that may exist in the layout of the integrated circuit. As desired, the constructor component 114 can compare the parasitic netlist 416 to other information (e.g., schematic information relating to the integrated circuit design) to facilitate verifying the information in the parasitic netlist 416. In certain implementations, the constructor component 114 also can perform a design rule check to determine whether the integrated circuit design satisfies circuit layout requirements, in accordance with the defined design criteria.

With further regard to the improved design and the parasitic netlist 416, the constructor component 114 can perform a simulation on the integrated circuit design based at least in part on the information in the parasitic netlist, which can include the parasitic properties from the integrated circuit design (e.g., layout), to facilitate improving the accuracy of, for example, a timing model, a power model, and/or a noise model associated with the integrated circuit design.

Based at least in part on the results of the analysis of the integrated circuit performed during the extraction process 414, the constructor component 114 also can perform a static timing analysis 418 on the integrated circuit. Based at least in part on the results of performing the static timing analysis, in response to determining that certain cells do not satisfy the defined design criteria with regard to slew characteristics (e.g., slew rate), the constructor component 114 can determine and perform slew improvement 420 (e.g., slew optimization) on those certain cells to modify one or more characteristics of those cells, or to modify other elements of the circuit associated with those cells, to facilitate improving slew characteristics (e.g., slew rate) associated with those cells. Also, based at least in part on the results of performing the static timing analysis, in response to determining that particular cells do not satisfy the defined design criteria with regard to cell stacking, the constructor component 114 can determine and perform high stack cell removal 422 on those particular cells to remove a cell(s) or modify cell stacking, to facilitate improving the integrated circuit design and satisfy the defined design criteria.

Also, based at least in part on the results of performing the static timing analysis, the constructor component 114 can apply cell-specific slew criteria 424 (e.g., cell-specific slew limits), and, based at least in part on the cell-specific slew criteria, the constructor component can perform slew sensitive cell removal 426 to remove any cell that does not satisfy the cell-specific slew criteria 424. Also, based at least in part on the results of performing the static timing analysis, the constructor component 114 can perform slack based variation sensitive cell enhancement 428 (e.g., optimization) to enhance a cell(s), in response to the constructor component 114 determining that the cell(s) violates (e.g., does not satisfy) an applicable design constraint. The constructor component 114 can modify one or more attributes of or associated with such cell to enhance (e.g., optimize) the attributes and/or performance of the cell, so that the cell can satisfy the design constraint, to achieve the target performance criteria for the cell, in accordance with the defined design criteria (e.g., the applicable design constraint).

Employing the techniques and aspects of the disclosed subject matter, the system 100 can provide improved design of an integrated circuit that can have an improved (e.g., increased) chance of satisfying (e.g., meeting) target circuit design or performance criteria when implemented in silicon, can be more efficient in achieving the desired design and performance of an integrated circuit (e.g., can utilize less resources and information, and can take less time, to achieve the desired design and performance of the integrated circuit), as compared to conventional systems, methods, and techniques (e.g., corner-based method, OCV method, AOCV method, POCV method) for designing integrated circuits. For instance, employing the techniques and aspects of the disclosed subject matter, the system 100 can generate an integrated circuit design that can achieve the same or an improved target frequency as that associated with a conventional corner-based analysis, while providing a reduction in variation sensitivity associated with the integrated circuit, which can provide an improved probability of achieving a desired frequency target when implemented in silicon, as compared with conventional techniques.

Figure 5:
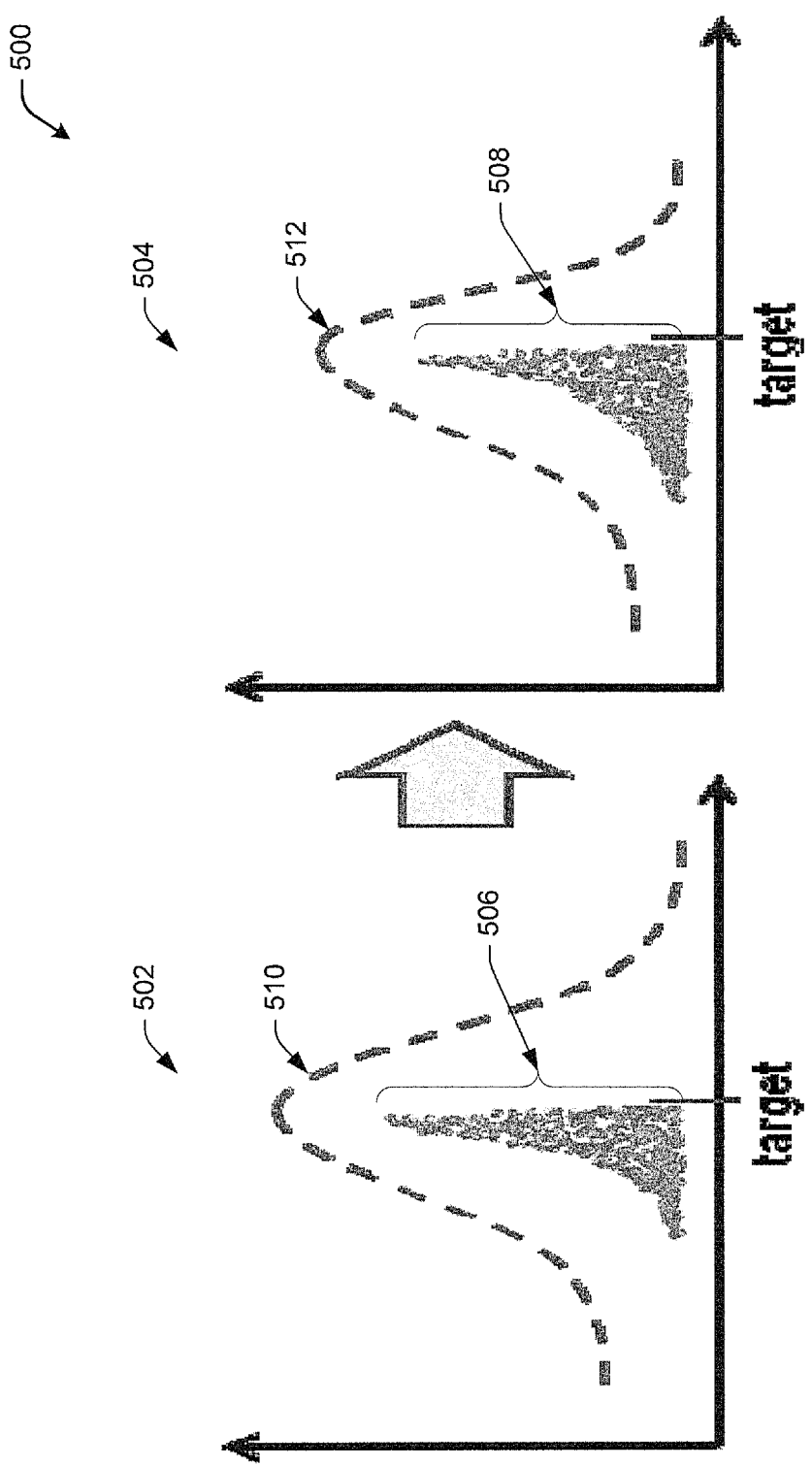
FIG. 5 depicts a diagram of example statistical distributions of circuit design timing spreads relating to example integrated circuit designs, in accordance with various aspects and embodiments of the disclosed subject matter.

Referring briefly to FIG. 5 (along with FIG. 1), FIG. 5 depicts a diagram of example statistical distributions 500 of circuit design timing spreads relating to example integrated circuit designs, in accordance with various aspects and embodiments of the disclosed subject matter. The statistical distribution 502 represents an integrated circuit design prior to optimization of the integrated circuit design using the techniques of the disclosed subject matter (e.g., as employed by the characterizer component 102 and constructor component 114). The statistical distribution 504 represents the integrated circuit design after optimization of the integrated circuit design using the techniques of the disclosed subject matter (e.g., as employed by the characterizer component 102 and constructor component 114).

With regard to the statistical distribution 502 and the statistical distribution 504, the respective portions (e.g. collection of dots) underneath the respective dotted lines represent the respective path distributions (e.g., path distributions 506 for the statistical distribution 502, path distributions 508 for the statistical distribution 504) of a completed integrated circuit design, and the respective dotted lines of the statistical distribution 502 and the statistical distribution 504 represent the respective statistical distributions based on random device variation (e.g., statistical distribution based on random device variation 510 for the statistical distribution 502, statistical distribution based on random device variation 512 for the statistical distribution 504) of the respective path distributions (e.g., path distributions 506, path distributions 508) based at least in part on random device variation associated with the respective integrated circuit designs.

As can be observed with respect to the statistical distribution 502 prior to optimization of the integrated circuit design, there are a higher number of paths in the path distribution 506 that are near the target frequency (target). This can yield a higher likelihood that the integrated circuit design would miss (e.g., not achieve) the desired target (e.g., target structure and performance of the integrated circuit) when it is implemented in silicon during fabrication of the integrated circuit. Further, as can be observed with respect to the statistical distribution 504, which can be the results after optimization of the integrated circuit design, there is a relatively wider spread of path frequency, as compared to the statistical distribution 502. This can lead to an improved integrated circuit design that can have an improved probability of satisfying (e.g., meeting) the desired target (e.g., the target structure and performance of the integrated circuit) when it is implemented in silicon during fabrication of the integrated circuit, as compared to the statistical distribution 502 prior to optimization of the integrated circuit design.

Figure 6:
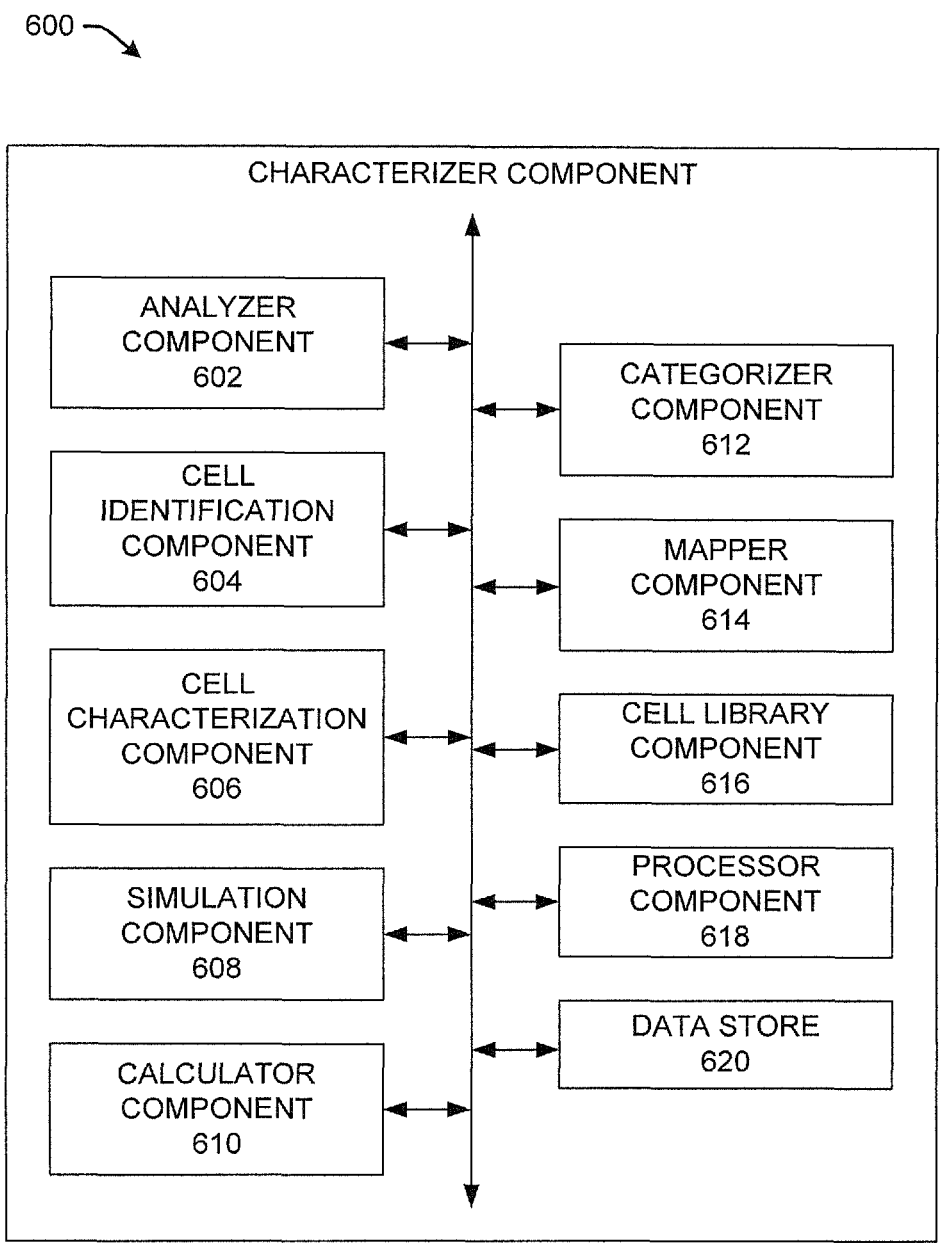
FIG. 6 illustrates a block diagram of an example, non-limiting embodiment of a characterizer component, in accordance with various aspects and embodiments of the disclosed subject matter.

FIG. 6 illustrates a block diagram of an example, non-limiting embodiment of a characterizer component 600, in accordance with various aspects and embodiments of the disclosed subject matter. The characterizer component 600 can comprise, for example, an analyzer component 602, a cell identification component 604, a cell characterization component 606, a simulation component 608, a calculator component 610, a categorizer component 612, a mapper component 614, and a cell library component 616.

The analyzer component 602 can perform analysis on data and cells (e.g., information associated with cells) associated with the integrated circuit design, and can generate analysis results based at least in part on the analysis. For instance, the analyzer component 602 can analyze the cells to facilitate identifying and selecting a subset of the set of cells that can be representative cells that can be employed to represent respective subsets of other cells of the cell set, based at least in part on attributes (e.g., cell height, channel width, vt doping, stack height) of the cells and the defined design criteria. The analyzer component 602 also can analyze simulation results generated from simulation of the integrated circuit design by the simulation component 608. The analyzer component 602 also can perform other data analysis and/or cell analysis, such as more fully disclosed herein.

The cell identification component 604 can identify and select representative cells from the set of cells based at least in part on the results of an analysis of the cells by the analyzer component 602, the respective attributes of the cells, and the defined designed criteria. For example, based at least in part on the analysis results, the cell identification component 604 can identify and select a relatively small number of representative cells from the set of cells to be in the subset of representative cells (e.g., a subset of representative cells that can be approximately less than 1%, 1%, 2%, . . . 10%, or other desired percentage of the overall number of cells in the cell set), based at least in part on the analysis results, the respective attributes of the cells, and the defined designed criteria.

The cell characterization component 606 can characterize the respective representative cells of the subset of representative cells based at least in part on the defined design criteria, which can comprise construction criteria and/or simulation criteria. The construction criteria can include, for example, the input transition rate, output loading, and/or transition rate associated with the representative cells. The simulation criteria can comprise, for example, process, voltage, and/or temperature associated with the representative cells.

The simulation component 608 can perform simulations of the representative cells in the subset to simulate operations and functions of the respective representative cells. The simulation component 608 can perform the simulations of the representative cells to generate simulation results that can comprise, for example, the respective mean and standard deviation of delay, and the mean and standard deviation of output transition rate, associated with the respective representative cells.

The calculator component 610 can be employed to perform various calculations on data in connection with the analyzing of data or simulation of the cells. For example, the calculator component 610 can be employed to calculate the respective mean and standard deviation of delay, and the mean and standard deviation of output transition rate, associated with the respective representative cells, based at least in part on the simulation results obtained by the simulation component 608. The calculator component 610 also can be used to calculate the ratio of standard deviation to delay and ratio of standard deviation to operating clock period associated with the representative cells based at least in part on the analysis results or simulation results associated with the representative cells.

The analyzer component 602 also can be employed to analyze, for example, the ratio of standard deviation to delay and ratio of standard deviation to operating clock period associated with the representative cells to generate analysis results comprising design-based information relating to the integrated circuit design and cell-based information relating to the respective representative cells. The design-based information can be used to facilitate guiding the useful limitation of a particular representative cell, based at least in part on its mean delay (e.g., mean amount of delay) and transition rate, as a generic guideline to the overall design of the integrated circuit to facilitate limiting variation exposure.

The categorizer component 612 can categorize the respective representative cells as being either usable, usable under certain conditions or limitations (e.g., under further limitation of mean delay and/or transition rate), or unusable, based at least in part on the respective cell-related information associated with the respective representative cells. It is to be appreciated and understood that the categorization of the representative cells does not have to be limited to the three categories: usable, usable under certain conditions or limitations, or unusable, as the categorization of the representative cells can be more granular to include more categories (e.g., to include multiple categories for cells that can be usable under certain conditions or limitations).

The mapper component 614 can map the respective representative cells to respective subsets of other cells of the cell set for which the respective representative cells have been selected to represent. For example, the mapper component 614 can map information (e.g., cell-based information, categorization information, characteristics) relating to a first representative cell to a first subset of cells for which the first representative cell was selected to represent, can map information relating to a second representative cell to a second subset of cells for which the second representative cell was selected to represent, can map information relating to a third representative cell to a third subset of cells for which the third representative cell was selected to represent, and so on, with regard to each representative cell.

The cell library component 616 can be employed to store information (e.g., cell-based information, categorization information, characteristics, mapping information) relating to the respective cells (e.g., representative cells, cells to which a representative cell is mapped). Such information relating to the respective cells that is stored in the cell library component 616 can be made available to, for example, the constructor component to facilitate reconstructing the integrated circuit design, improving (e.g., optimizing) cells and the integrated circuit design, and achieving a desired final integrated circuit design (e.g., a design that achieves a desired target frequency), in accordance with the defined design criteria.

The characterizer component 600 also can comprise a processor component 618 that can operate in conjunction with the other components (e.g., analyzer component 602, cell identification component 604, cell characterization component 606, and other components disclosed herein) to facilitate performing the various functions of the characterizer component 600, such as disclosed herein. The processor component 618 can employ one or more processors (e.g., central processing units (CPUs), graphical processing units (GPUs), field-programmable gate arrays (FPGAs)), microprocessors, or controllers that can process data, such as information (e.g., data, analog or digital information) relating to operations performed by the characterizer component 600, etc., to facilitate analyzing data or cells, identifying representative cells, characterizing cells, simulating operation of cells (e.g., representative cells), performing calculations on data, categorizing cells, creating the cell library component 616, and/or performing other operations; can control data flow between the characterizer component 600 and other components (e.g., constructor component) associated with (e.g., connected to) the characterizer component 600; and can control data flow between the various components of the characterizer component 600.

In yet another aspect, the characterizer component 600 also can include a data store 620 that can store data structures (e.g., voice information, data, metadata); code structure(s) (e.g., modules, objects, classes, procedures), commands, or instructions; information relating to analyzing data or cells, identifying representative cells, characterizing cells, simulating operation of cells (e.g., representative cells), performing calculations on data, categorizing cells, creating the cell library component 616, and/or performing other operations; parameter data; information relating to algorithms (e.g., algorithm(s) relating to identifying representative cells, algorithm(s) relating to characterizing cells, algorithm(s) relating to simulating operation of cells, algorithm(s) relating to categorizing of cells, algorithm(s) relating to mapping representative cells to other cells); and so on. In an aspect, the processor component 618 can be functionally coupled (e.g., through a memory bus) to the data store 620 in order to store and retrieve information desired to operate and/or confer functionality, at least in part, to analyzer component 602, cell identification component 604, cell characterization component 606, and other components disclosed herein, and/or substantially any other operational aspects of the characterizer component 600.

It is to be appreciated and understood that the various components of the characterizer component 600 can communicate information between each other and/or between other components associated with the characterizer component 600 as desired to carry out operations of the characterizer component 600. It is to be further appreciated and understood that respective components (e.g., analyzer component 602, cell identification component 604, cell characterization component 606, and other components disclosed herein) of the characterizer component 600 each can be a stand-alone unit, can be included within the characterizer component 600 (as depicted), can be incorporated within another component of the characterizer component 600, or can be a component separate from the characterizer component 600, and/or virtually any suitable combination thereof, as desired.

Figure 7:
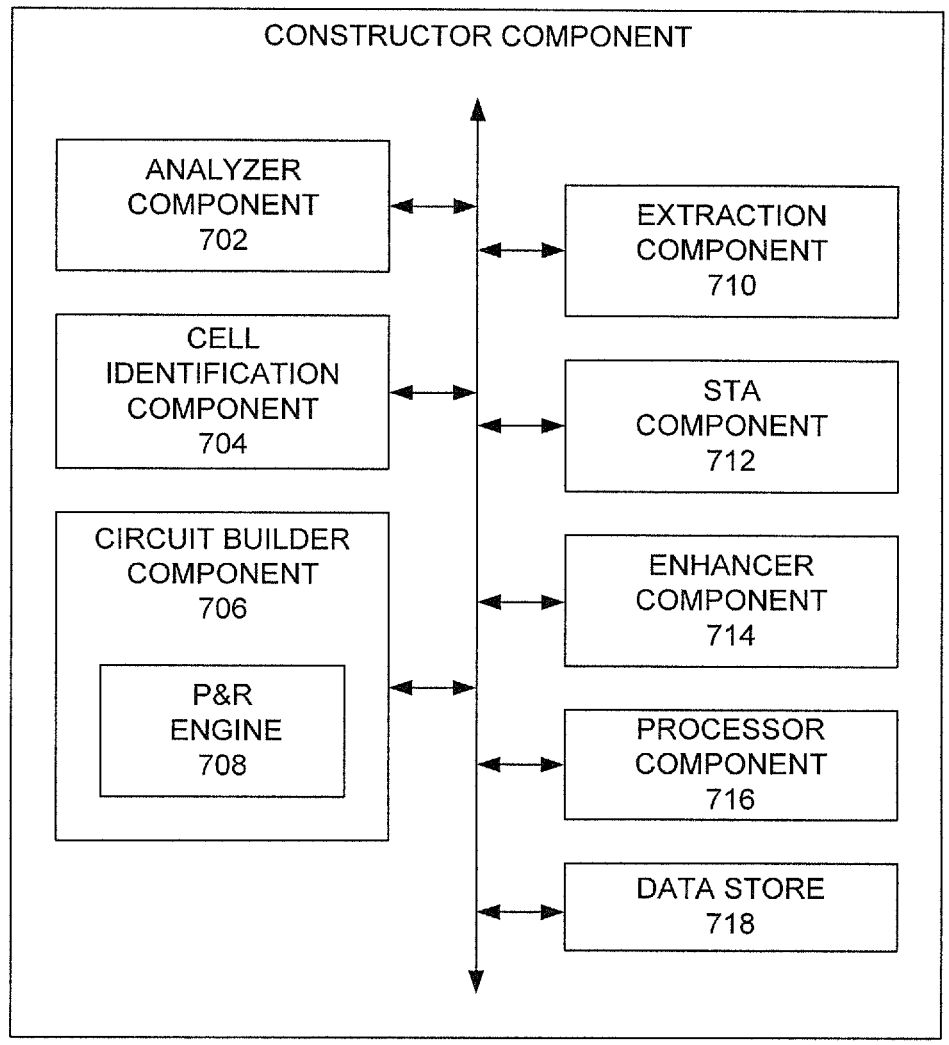
FIG. 7 depicts a block diagram of an example, non-limiting embodiment of a constructor component, in accordance with various aspects and embodiments of the disclosed subject matter.

FIG. 7 depicts a block diagram of an example, non-limiting embodiment of a constructor component 700, in accordance with various aspects and embodiments of the disclosed subject matter. The constructor component 700 can comprise, for example, an analyzer component 702, a cell identification component 704, a circuit builder component 706, a P&R engine 708, an extraction component 710, a static timing analysis (STA) component 712, and an enhancer component 714.

The analyzer component 702 can perform analysis on data and cells (e.g., information associated with cells) associated with the integrated circuit design, and can generate analysis results based at least in part on the analysis. For instance, the analyzer component 702 can access and analyze information regarding cells that can be stored in the cell library component to facilitate identifying and selecting a subset (e.g., a truncated list) of cells that can be employed in reconstructing a design of an integrated circuit, in accordance with the defined design criteria. The subset of cells can comprise, for example, cells categorized as usable (e.g., general usage cells) and/or cells categorized as having certain limits or conditions placed upon their use (e.g., limited or conditional usage cells). For instance, to facilitate identifying cells to be used and reconstruction of the design of the integrated circuit, the analyzer component 702 can analyze the cell-related information, including respective cell characteristics information, cell categorization information, information in the variation profile, etc., contained in the cell library component, timing constraints associated with the integrated circuit design, design constraints associated with the integrated circuit design, a design netlist (e.g., information that can describe connectivity of an electronic circuit, terminals of electronic components, and/or electrical conductors or connections between electronic components), and/or other information to generate analysis results based at least in part on such analysis. The analyzer component 702 also can perform other data analysis and/or cell analysis, such as more fully disclosed herein.

The cell identification component 704 can identify and select the subset of cells (e.g., a portion of the cells that can be general usage cells and/or limited usage cells) based at least in part on the results of an analysis of information regarding the cells (e.g., contained in the cell library component) by the analyzer component 702, the respective attributes of the cells, and the defined designed criteria. For example, based at least in part on the analysis results, the cell identification component 704 can identify and select general usage cells and limited usage cells that can be utilized, or at least potentially can be utilized, when reconstructing the design of the integrated circuit, in accordance with the defined design criteria (e.g., comprising design constraints relating to the integrated circuit).

The circuit builder component 706 can reconstruct the integrated circuit based at least in part on the list of available cells (e.g., truncated list of available cells that can include cells categorized as general usage and cells categorized as limited usage) and any additional design constraints that may be applicable to certain cells of the list of available cells, using the information regarding the cells contained in the cell library component. For instance, based at least in part on analysis results from analyzing the cell-related information, including respective cell characteristics information, cell categorization information, information in the variation profile, timing constraints associated with the integrated circuit design, design constraints associated with the integrated circuit design, the design netlist, and/or other information, the circuit builder component 706, which can employ the P&R engine 708. Based at least in part on the results of such analysis, the circuit builder component 706 (e.g., employing P&R engine 708) can reconstruct the integrated circuit by determining and implementing placement of the cells or other components (e.g., placement of electronic components, circuitry, and logic elements) in the circuit and by determining and implementing routing connections between the various cells or other components to achieve the desired functionality of the integrated circuit, in accordance with the defined design criteria. The circuit builder component 706 can structure the reconstruction of the integrated circuit based at least in part on the respective categorization of the cells in the cell library component. The circuit builder component 706 also can hide, eliminate, or mitigate low drive cells and/or tight slew limits associated with certain cells in connection with the reconstruction of the integrated circuit.

The extraction component 710 can perform an extraction process in connection with analyzing (e.g., employing the analyzer component 702) the reconstructed integrated circuit. In some implementations, the extraction component 710 can perform a parasitic extraction process on the integrated circuit design and its constituent elements (e.g., cells, connectors between cells) to facilitate determining an improved (e.g., optimized) circuit design and a parasitic netlist, which can comprise information relating to parasitic properties (e.g., undesirable or sub-optimal properties) that may exist in the layout of the integrated circuit. For example, the extraction component 710 can identify a limited usage cell that is not satisfying one or more conditions applicable to the limited usage cell, wherein the one or more conditions can relate to a mean delay, transition rate, or other condition or parameter associated with the limited usage cell.

The STA component 712 can be employed to perform a timing analysis (e.g., a static timing analysis) on the integrated circuit design. Based at least in part on the results of performing the timing analysis, the results (e.g., parasitic netlist) of the extraction process, and/or the results of evaluating additional limitations or conditions placed on certain cells (e.g., limited usage cells) used in the reconstructed integrated circuit, the STA component 712 or the enhancement component 714 can determine whether a cell (e.g., limited usage cell) satisfies the defined design criteria (e.g., applicable design constraints or conditions), determine whether a cell that is determined to not satisfy the defined design criteria is to be enhanced (e.g., based at least in part on a tier level associated with the cell), and/or determine an enhancement that can be made to a cell that is determined to not satisfy the defined design criteria. The STA component 712 or the enhancement component 714 can evaluate the analysis results from the analysis performed on the reconstructed integrated circuit in connection with evaluating the additional limitations or conditions on certain cells (e.g., limited usage cells) used in the reconstructed integrated circuit.

In some implementations, as part of the static timing analysis, in response to determining that certain cells do not satisfy the defined design criteria (e.g., defined design criteria relating to slew characteristics (e.g., slew rate)), the STA component 712 or the enhancement component 714 can perform slew improvement (e.g., optimization), perform high stack cell removal, perform slew sensitive cell removal, and/or perform an enhancement for cells that are determined to be slack based variation sensitive, as more fully disclosed herein.

For example, based at least in part on the results of performing the timing analysis, the results (e.g., parasitic netlist) of the extraction process, and/or the results of evaluating additional limitations or conditions placed on certain cells (e.g., limited usage cells) used in the reconstructed integrated circuit, the STA component 712 or the enhancement component 714 can identify or determine whether a cell satisfies or does not satisfy (e.g., violates) a set of conditions (e.g., one or more applicable design constraint), in accordance with the defined design criteria. In response to the STA component 712 or the enhancement component 714 determining that a cell does not satisfy the set of conditions, the STA component 712 or the enhancement component 714 can weigh the overall path associated with the cell and can further tier (e.g., adjust a tier level or value for) the overall path associated with the cell based at least in part on its path slack. Also, with respect to a cell that is determined to not satisfy the set of conditions, if the STA component 712 or the enhancement component 714 determines that such cell or associated path is in a critical tier (e.g., a tier that is determined to satisfy a defined level or value of criticality), in accordance with the defined design criteria, comprising a defined design criterion relating to defining the level of criticality of a cell or associated path, the STA component 712 or the enhancement component 714 can modify one or more attributes or features of or associated with the cell or associated path to enhance (e.g., optimize) the attributes and/or performance of the cell (e.g., modify the cell to improve (e.g., reduce) variation sensitivity associated with the cell), so that the cell can satisfy the set of conditions, to achieve the target performance criteria (e.g., based at least in part on a target frequency) for the cell, in accordance with the defined design criteria.

The constructor component 700 also can comprise a processor component 716 that can operate in conjunction with the other components (e.g., analyzer component 702, cell identification component 704, circuit builder component 706, and other components disclosed herein) to facilitate performing the various functions of the constructor component 700, such as disclosed herein. The processor component 716 can employ one or more processors (e.g., central processing units (CPUs), graphical processing units (GPUs), field-programmable gate arrays (FPGAs)), microprocessors, or controllers that can process data, such as information (e.g., data, analog or digital information) relating to operations performed by the constructor component 700, etc., to facilitate analyzing data or cells relating to a design of an integrated circuit, identifying cells for use in reconstructing the design of the integrated circuit, determining whether a cell satisfies a set of conditions applicable to the cell, weighting a path associated with a cell, modifying a tier associated with a cell or associated path, determining an enhancement to employ to improve performance of a cell that is determined to not satisfy the set of conditions, and/or performing other operations; can control data flow between the constructor component 700 and other components (e.g., characterizer component) associated with (e.g., connected to) the constructor component 700; and can control data flow between the various components of the constructor component 700.

In yet another aspect, the constructor component 700 also can include a data store 718 that can store data structures (e.g., voice information, data, metadata); code structure(s) (e.g., modules, objects, classes, procedures), commands, or instructions; information relating to analyzing data or cells relating to a design of an integrated circuit, identifying cells for use in reconstructing the design of the integrated circuit, determining whether a cell satisfies a set of conditions applicable to the cell, weighting a path associated with a cell, modifying a tier associated with a cell or associated path, determining an enhancement to employ to improve performance of a cell that is determined to not satisfy the set of conditions, and/or performing other operations; parameter data; information relating to algorithms (e.g., algorithm(s) relating to identifying cells for use in reconstructing the design of the integrated circuit, algorithm(s) relating to determining whether a cell satisfies a set of conditions applicable to the cell, algorithm(s) relating to weighting a path associated with a cell, algorithm(s) relating to modifying a tier associated with a cell or associated path, algorithm(s) relating to determining an enhancement to employ to improve performance of a cell); and so on. In an aspect, the processor component 716 can be functionally coupled (e.g., through a memory bus) to the data store 718 in order to store and retrieve information desired to operate and/or confer functionality, at least in part, to analyzer component 702, cell identification component 704, circuit builder component 706, and other components disclosed herein, and/or substantially any other operational aspects of the constructor component 700.

It is to be appreciated and understood that the various components of the constructor component 700 can communicate information between each other and/or between other components associated with the constructor component 700 as desired to carry out operations of the constructor component 700. It is to be further appreciated and understood that respective components (e.g., analyzer component 702, cell identification component 704, circuit builder component 706, and other components disclosed herein) of the constructor component 700 each can be a stand-alone unit, can be included within the constructor component 700 (as depicted), can be incorporated within another component of the constructor component 700, or can be a component separate from the constructor component 700, and/or virtually any suitable combination thereof, as desired.

Figure 8:
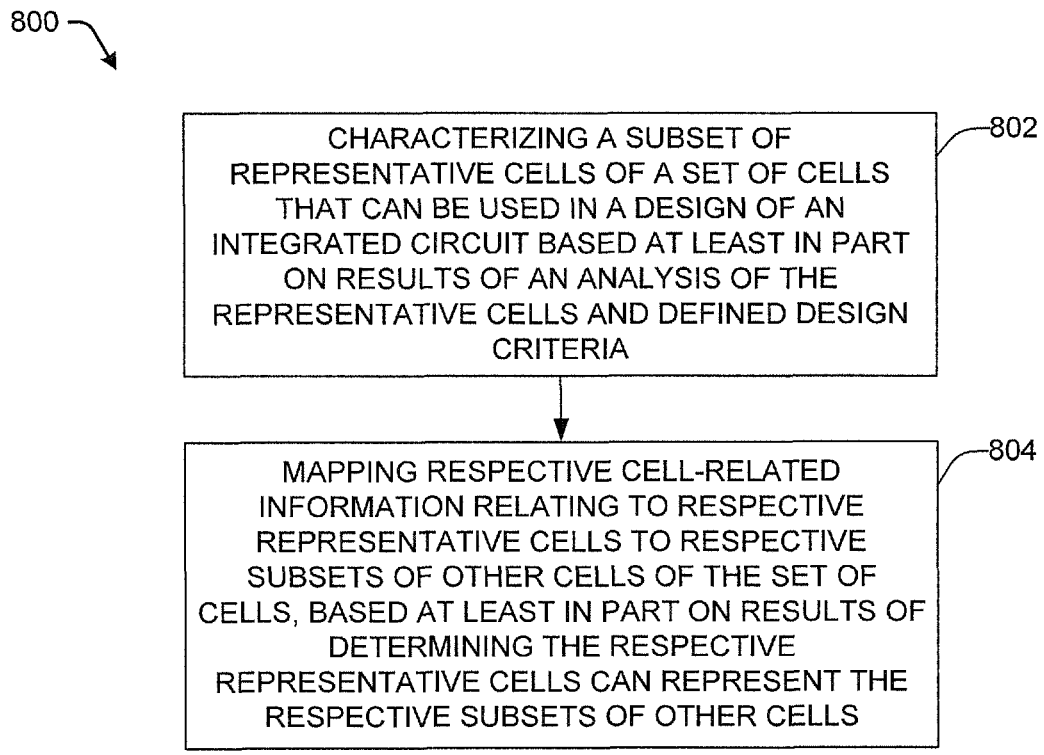
FIG. 8 depicts a flow diagram of an example method that can efficiently characterize cells to facilitate improving an integrated circuit design, in accordance with various aspects and embodiments of the disclosed subject matter.
Figure 9:
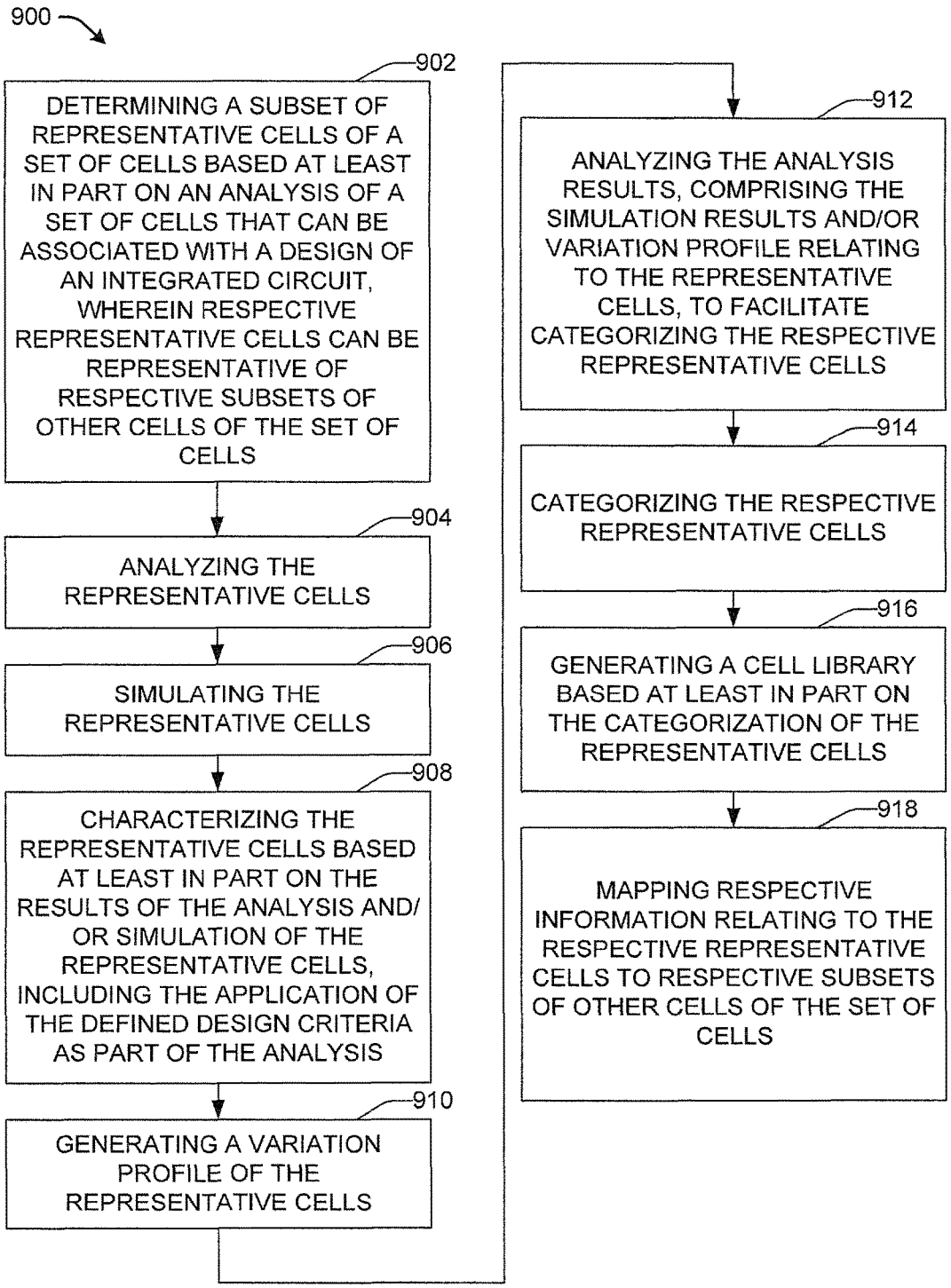
FIG. 9 illustrates a flow diagram of another example method that can efficiently characterize cells to facilitate improving an integrated circuit design, in accordance with various aspects and embodiments of the disclosed subject matter.
Figure 10:
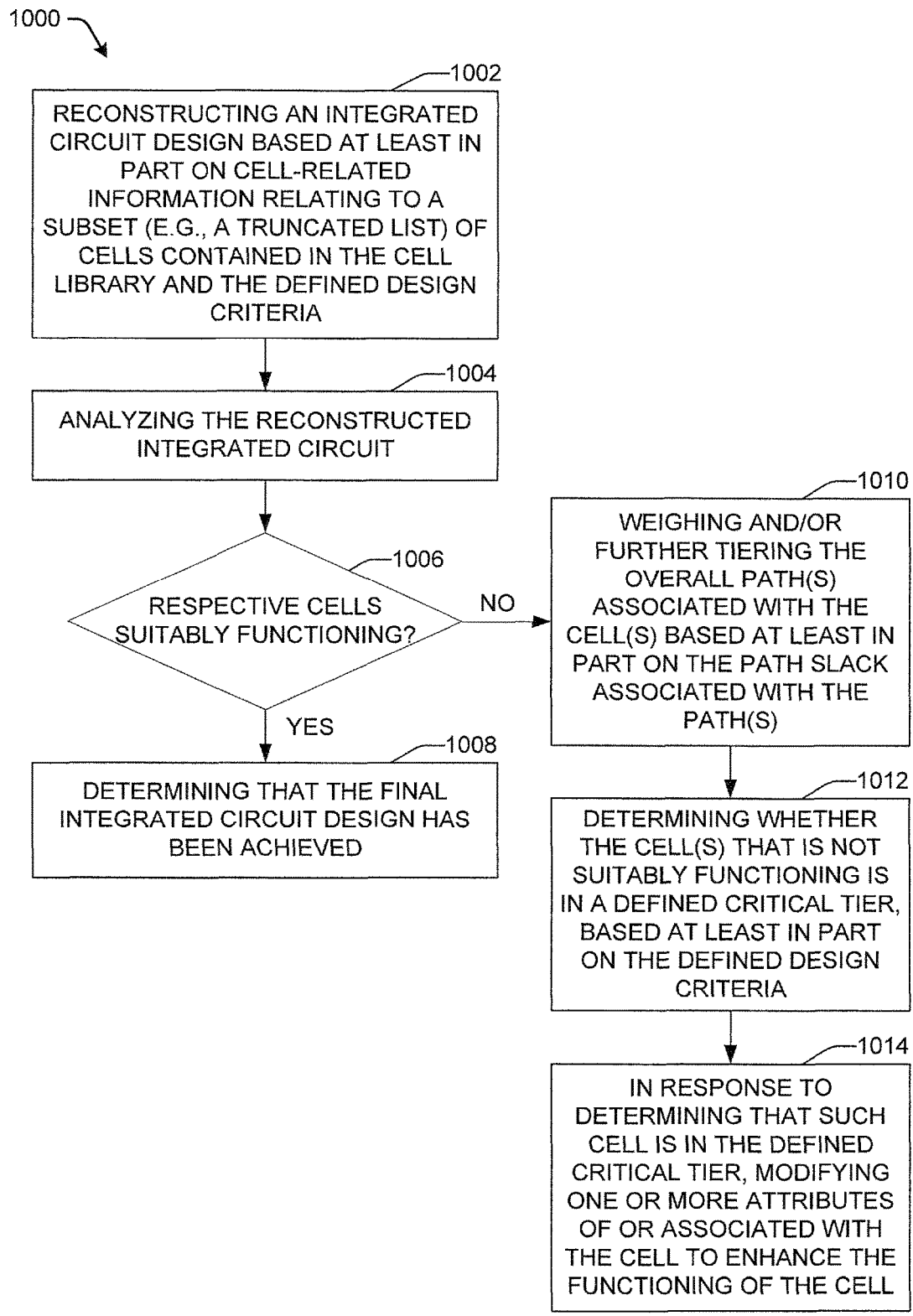
FIG. 10 presents a flow diagram of an example method 1000 for efficiently reconstructing an integrated circuit using information from a cell library generated based at least in part on representative cells of a set of cells associated with the industrial circuit, in accordance with various aspects and embodiments of the disclosed subject matter.

In view of the example systems described above, methods that may be implemented in accordance with the described subject matter may be better appreciated with reference to the flow charts of FIGS. 8-10. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 8 depicts a flow diagram of an example method 800 that can efficiently characterize cells to facilitate improving an integrated circuit design, in accordance with various aspects and embodiments of the disclosed subject matter. The method 500 can be implemented by the characterizer component, for example.

At block 802, a subset of representative cells of a set of cells that can be used in the design of an integrated circuit can be characterized based at least in part on results of an analysis of the representative cells and the defined design criteria. The characterizer component can determine or identify a subset of cells (e.g., representative cells) of a set of cells that respectively can be representative of other respective subsets of cells of the set of cells, based at least in part on respective characteristics (e.g., cell height, channel width, vt doping, stack height) of the cells of the set of cells. The characterizer component can analyze the representative cells in the subset of representative cells, and based at least in part on the results of that analysis and the application of the defined design criteria, which can comprise construction criteria and/or simulation criteria, as more fully disclosed herein, the characterizer component can characterize the representative cells of the subset of representative cells.

At block 804, respective cell-related information relating to respective representative cells of the subset of representative cells can be mapped to respective subsets of other cells of the set of cells, based at least in part on results of determining the respective representative cells can represent the respective subsets of other cells. With regard to each representative cell, the characterizer component can map cell-related information relating to the representative cell to a subset of other cells for which the characterizer component has determined can be represented by the representative cell.

The characterizer component can generate a cell library that can comprise cell-related information and other information relating to the representative cells as well as cell-related information relating to the respective subsets of other cells represented by the representative cells. The constructor component can utilize the information in the cell library to reconstruct the integrated circuit and improve (e.g., optimize) the integrated circuit design, in accordance with the defined design criteria, as more fully described herein.

FIG. 9 illustrates a flow diagram of another example method 900 that can efficiently characterize cells to facilitate improving an integrated circuit design, in accordance with various aspects and embodiments of the disclosed subject matter. The method 900 can be implemented by a characterizer component, for example.

At block 902, a subset of representative cells of a set of cells can be determined based at least in part on an analysis of a set of cells that can be associated with a design of an integrated circuit, wherein respective representative cells can be representative of respective subsets of other cells of the set of cells. The characterizer component can determine the subset of representative cells of the set of cells based at least in part on the analysis of the set of cells (e.g., based at least in part on an analysis of the respective attributes (e.g., physical and/or logical attributes) of the respective cells of the set of cells), in accordance with the defined design criteria, as more fully described herein.

At block 904, the representative cells can be analyzed. The characterizer component can analyze the representative cells of the subset of representative cells, based at least in part on the defined design criteria, which can comprise construction criteria and simulation criteria that can be applicable to the integrated circuit design.

At block 906, the representative cells can be simulated. In connection with the analysis of the representative cells at block 904, the characterizer component can perform a simulation of the operation of the respective representative cells and can generate simulation results based at least in part on the simulation of the representative cells, in accordance with the defined simulation criteria. The characterizer component can perform a simulation of the representative cells to simulate the respective operation of the representative cells and generate simulation results relating to the simulation of the operation of the respective representative cells, in accordance with the defined simulation criteria.

At block 908, the representative cells can be characterized based at least in part on the results of the analysis and/or simulation of the representative cells, including the application of the defined design criteria as part of the analysis. The characterizer component can characterize the representative cells based at least in part on the results of the analysis and/or simulation of the representative cells and the application of the defined design criteria.

At block 910, a variation profile of the representative cells can be generated. The characterizer component can generate the variation profile for the representative cells, based at least in part on the results of the analysis of the representative cells and the application of the defined design criteria, wherein the variation profile can comprise respective variation information of the respective representative cells relating to the variation of the respective responses or characteristics of the respective representative cells based at least in part on the analysis and/or simulation of the respective representative cells, in accordance with the defined design criteria.

At block 912, the analysis results, comprising the simulation results and/or the variation profile relating to the representative cells, can be analyzed to facilitate categorizing the respective representative cells. The characterizer component can analyze all or a part of the collection of analysis results, comprising the simulation results and/or the variation profile relating to the representative cells, to facilitate categorizing the respective representative cells.

At block 914, the representative cells can be categorized, for example, as being a cell that can have general usage, a cell that can have limited usage, or an unusable cell, in connection with the design of the integrated circuit, based at least in part on the results of the analysis of the representative cells and/or the variation profile relating to the representative cells. The characterizer component can characterize the respective representative cells as a cell that can have general usage, a cell that can have limited usage, or an unusable cell, in connection with the design of the integrated circuit, based at least in part on the results of the analysis of the representative cells and/or the variation profile relating to the representative cells.

At block 916, a cell library can be generated based at least in part on the categorization of the representative cells. The characterizer component can generate the cell library (e.g., annotated cell library), comprising respective cell-related information regarding the respective representative cells, based at least in part on the respective categorization of the respective representative cells.

At block 918, respective information relating to the respective representative cells can be mapped to respective subsets of other cells of the set of cells, based at least in part on, with respect to each representative cell, a determination regarding the subset of other cells that can be represented by the representative cell. The characterizer component can map the respective information relating to the respective representative cells to respective subsets of other cells of the set of cells, based at least in part on, the determination regarding the respective subsets of other cells that can be represented by the respective representative cells. As desired, the characterizer component can supplement the cell library to include mapping information regarding the mapping of respective representative cells to respective other subsets of other cells, respective cell-related information regarding the respective other cells of the respective subsets of other cells, and/or other desired information, based at least in part on the mapping of the respective representative cells to the respective subsets of other cells of the set of cells.

The constructor component can access the cell library and can utilize the information in the cell library to reconstruct the integrated circuit and improve (e.g., optimize) the integrated circuit design, in accordance with the defined design criteria, as more fully described herein.

FIG. 10 presents a flow diagram of an example method 1000 for efficiently reconstructing an integrated circuit using information from a cell library generated based at least in part on representative cells of a set of cells associated with the industrial circuit, in accordance with various aspects and embodiments of the disclosed subject matter. The method 1000 can be implemented by the constructor component, for example.

At block 1002, an integrated circuit design can be reconstructed based at least in part on cell-related information relating to a subset (e.g., a truncated list) of cells contained in the cell library (e.g., annotated cell library) and the defined design criteria. The constructor component can reconstruct the integrated circuit design based at least in part on the cell-related information relating to the subset of cells and the defined design criteria. Based at least in part on the cell-related information relating to the subset (e.g., truncated list) of cells, the constructor component can identify the cells of general usage, the cells of general usage, and the unusable cells, and can utilize the cells of general usage and the cells of general usage in reconstructing the integrated circuit design based at least in part on cell-related information relating to the cells of general usage and the cells of general usage. In determining how to construct the integrated circuit design, the constructor component can take into account the design constraints that are applicable to the integrated circuit design and the limitations on the use of some cells, such as the cells categorized as having limited usage. For example, with regard to a cell categorized as having a limited usage, the constructor component can evaluate and consider minimum criteria and/or maximum criteria that are to be satisfied when using such cell and/or correspondingly, the range of acceptable use relating to an attribute(s) of such cell.

At block 1004, the reconstructed integrated circuit can be analyzed. The constructor component can analyze the reconstructed integrated circuit, including the cells therein, to facilitate determining whether the reconstructed integrated circuit is suitably functioning, including determining whether the respective cells of the reconstructed integrated circuit are suitably functioning, in accordance with the defined design criteria (e.g., whether the reconstructed integrated circuit satisfies the target frequency, in accordance with the defined design criteria). The constructor component can analyze the reconstructed integrated circuit, wherein the analysis can comprise the constructor component performing a timing analysis on the cells, in particular, the cells of limited usage to determine whether the cells are satisfying the respective design constraints applicable to the cells, in accordance with the defined design criteria.

At block 1006, a determination can be made regarding whether the respective cells of the reconstructed integrated circuit are suitably functioning, based at least in part on the results of the analysis of the reconstructed integrated circuit, in accordance with the defined design criteria. The constructor component can analyze determine whether the respective cells, and in particular, the limited-usage cells, of the reconstructed integrated circuit are suitably functioning, based at least in part on the results of the analysis of the reconstructed integrated circuit, in accordance with the defined design criteria.

At block 1008, in response to determining that the reconstructed integrated circuit is suitably functioning, including determining whether the respective cells of the reconstructed integrated circuit are suitably functioning, in accordance with the defined design criteria, it can be determined that the final integrated circuit design has been achieved. The constructor component can determine that the final integrated circuit design has been achieved, in response to determining that the reconstructed integrated circuit, including the respective cells therein, is suitably functioning, in accordance with the defined design criteria.

If, at block 1006, it is determined that the reconstructed integrated circuit is not suitably functioning, e.g., by determining a cell(s) of the reconstructed integrated circuit is not suitably functioning, at block 1010, the overall path(s) associated with the cell(s) can be weighed and/or further tiered based at least in part on the path slack associated with the path(s). For a cell that is determined to not be suitably functioning (e.g., for a cell for which it is determined that a cell violation has occurred), based at least in part on the defined design criteria (e.g., the design constraints applicable to the cell), the constructor component can weigh and/or further tier the overall path associated with the cell (e.g., adjust the tiering of the path) based at least in part on the path slack associated with the path associated with that cell. For example, the constructor component can weigh and/or adjust a tier level or value of the overall path associated with such cell based at least in part on the path slack associated with the path.

At block 1012, a determination can be made regarding whether the cell(s) that is not suitably functioning is in a defined critical tier, based at least in part on the defined design criteria, which can define the parameters of what constitutes a critical tier relating to cells. The constructor component can evaluate a cell that is not suitably functioning and can determine whether or not the cell is in the defined critical tier.

At block 1014, in response to determining that such cell is in the defined critical tier, one or more attributes of or associated with the cell can be modified to enhance the functioning of the cell. For instance, in response to determining that such cell is in the defined critical tier, the constructor component can modify one or more attributes of or associated with the cell to improve (e.g., optimize) the functioning of the cell, for example, to improve (e.g., reduce, mitigate) the variation sensitivity of the cell, in accordance with the defined design criteria. At this point, the method 1000 can return to block 1004 to analyze the reconstructed integrated circuit, as modified through the modification to the cell(s) that were determined to be violating a design constraint, and the method 1000 can continue to proceed from there to facilitate achieving the desired final integrated circuit design.

Example Computing Environment

Figure 11:
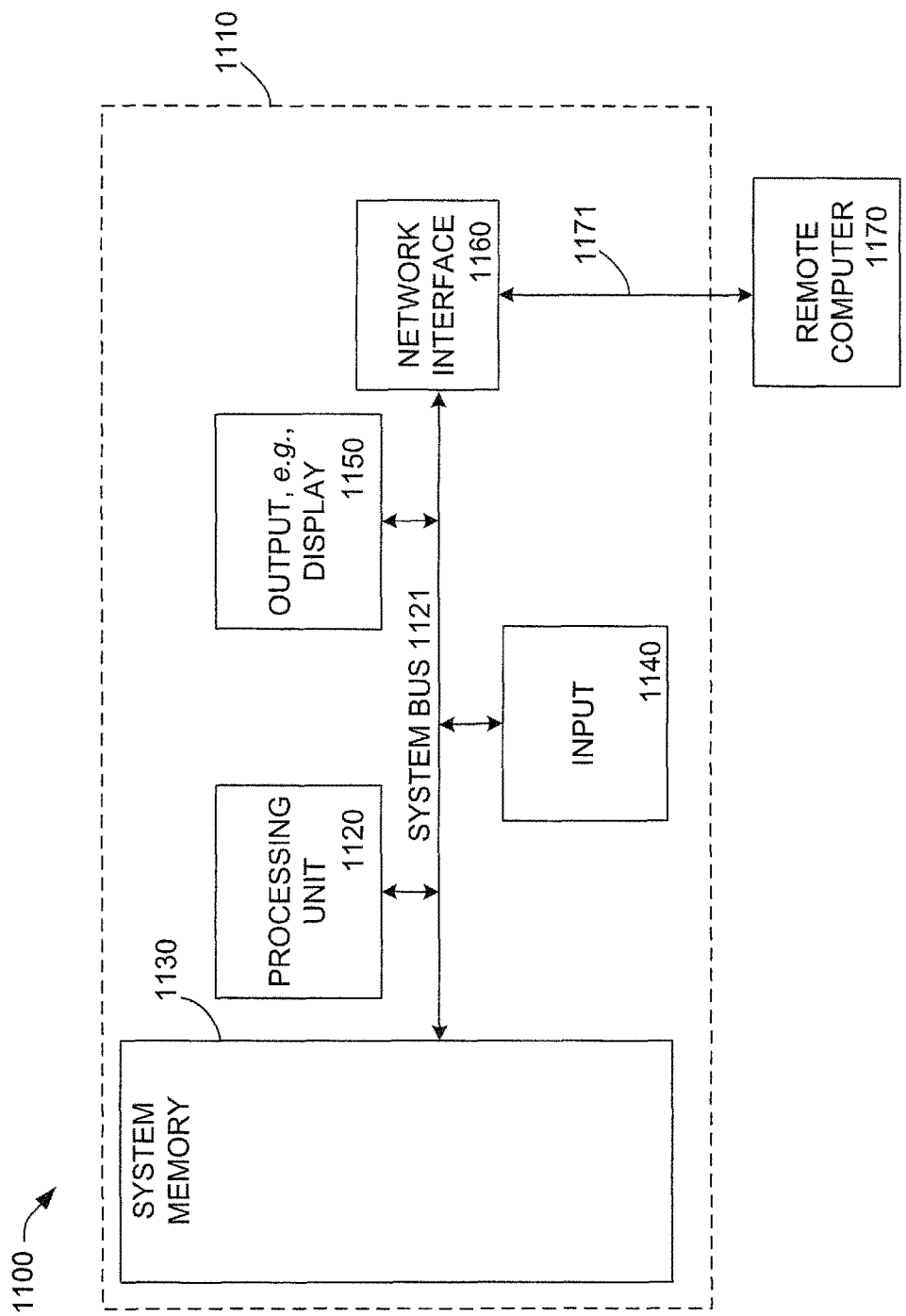
FIG. 11 illustrates a block diagram of an example electronic computing environment that can be implemented in conjunction with one or more aspects described herein.

As mentioned, advantageously, the techniques described herein can be applied to any device and/or network where analysis of data, identification of representative cells from a set of cells associated with an integrated circuit design, characterization of cells (e.g., representative cells), categorization of cells (e.g., representative cells), reconstructing of an integrated circuit design, and/or enhancement of performance of a cell (e.g., a limited or conditional usage cell), is desirable in a system comprising a device(s) or component(s) (e.g., characterizer component, mapper component, cell library component, constructor component). It is to be understood, therefore, that handheld, portable and other computing devices and computing objects of all kinds are contemplated for use in connection with the various non-limiting embodiments, e.g., anywhere that it can be desirable for a device to be employed to facilitate generation of a characterizer component, mapper component, cell library component, constructor component for use, respectively, in the analysis of data, identification of representative cells from a set of cells associated with an integrated circuit design, characterization of cells (e.g., representative cells), categorization of cells (e.g., representative cells), reconstruction of an integrated circuit design, and/or enhancement of performance of a cell (e.g., a limited or conditional usage cell), or to be employed to comprise or be associated with a characterizer component, mapper component, cell library component, constructor component to facilitate communication of data in connection with the analysis of data, identification of representative cells from a set of cells associated with an integrated circuit design, characterization of cells, categorization of cells, reconstruction of an integrated circuit design, and/or enhancement of performance of a cell. Accordingly, the below general purpose remote computer described below in FIG. 11 is but one example, and the disclosed subject matter can be implemented with any client having network/bus interoperability and interaction. Thus, the disclosed subject matter can be implemented in an environment of networked hosted services in which very little or minimal client resources are implicated, e.g., a networked environment in which the client device serves merely as an interface to the network/bus, such as an object placed in an appliance.

Although not required, some aspects of the disclosed subject matter can partly be implemented via an operating system, for use by a developer of services for a device or object, and/or included within application software that operates in connection with the component(s) of the disclosed subject matter. Software may be described in the general context of computer executable instructions, such as program modules or components, being executed by one or more computer(s), such as projection display devices, viewing devices, or other devices. Those skilled in the art will appreciate that the disclosed subject matter may be practiced with other computer system configurations and protocols.

FIG. 11 thus illustrates an example of a suitable computing system environment 1100 in which some aspects of the disclosed subject matter can be implemented, although as made clear above, the computing system environment 1100 is only one example of a suitable computing environment for a device and is not intended to suggest any limitation as to the scope of use or functionality of the disclosed subject matter. Neither should the computing environment 1100 be interpreted as having any dependency or requirement relating to any one or combination of components illustrated in the exemplary operating environment 1100.

With reference to FIG. 11, an exemplary device for implementing the disclosed subject matter includes a general-purpose computing device in the form of a computer 1110. Components of computer 1110 may include, but are not limited to, a processing unit 1120, a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures.

Computer 1110 typically includes a variety of computer readable media. Computer readable media can be any available media that can be accessed by computer 1110. By way of example, and not limitation, computer readable media can comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 1110. Communication media typically embodies computer readable instructions, data structures, program modules, or other data in a modulated data signal such as a carrier wave or other transport mechanism and includes any information delivery media.

The system memory 1130 may include computer storage media in the form of volatile and/or nonvolatile memory such as read only memory (ROM) and/or random access memory (RAM). A basic input/output system (BIOS), containing the basic routines that help to transfer information between elements within computer 1110, such as during start-up, may be stored in memory 1130. Memory 1130 typically also contains data and/or program modules that are immediately accessible to and/or presently being operated on by processing unit 1120. By way of example, and not limitation, memory 1130 may also include an operating system, application programs, other program modules, and program data.

The computer 1110 may also include other removable/non-removable, volatile/nonvolatile computer storage media. For example, computer 1110 could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. A hard disk drive is typically connected to the system bus 1121 through a non-removable memory interface such as an interface, and a magnetic disk drive or optical disk drive is typically connected to the system bus 1121 by a removable memory interface, such as an interface.

A user can enter commands and information into the computer 1110 through input devices such as a keyboard and pointing device, commonly referred to as a mouse, trackball, or touch pad. Other input devices can include a microphone, joystick, game pad, satellite dish, scanner, wireless device keypad, voice commands, or the like. These and other input devices are often connected to the processing unit 1120 through user input 1140 and associated interface(s) that are coupled to the system bus 1121, but may be connected by other interface and bus structures, such as a parallel port, game port, or a universal serial bus (USB). A graphics subsystem can also be connected to the system bus 1121. A projection unit in a projection display device, or a HUD in a viewing device or other type of display device can also be connected to the system bus 1121 via an interface, such as output interface 1150, which may in turn communicate with video memory. In addition to a monitor, computers can also include other peripheral output devices such as speakers which can be connected through output interface 1150.

The computer 1110 can operate in a networked or distributed environment using logical connections to one or more other remote computer(s), such as remote computer 1170, which can in turn have media capabilities different from device 1110. The remote computer 1170 can be a personal computer, a server, a router, a network PC, a peer device, personal digital assistant (PDA), cell phone, handheld computing device, a projection display device, a viewing device, or other common network node, or any other remote media consumption or transmission device, and may include any or all of the elements described above relative to the computer 1110. The logical connections depicted in FIG. 11 include a network 1171, such local area network (LAN) or a wide area network (WAN), but can also include other networks/buses, either wired or wireless. Such networking environments are commonplace in homes, offices, enterprise-wide computer networks, intranets and the Internet.

When used in a LAN networking environment, the computer 1110 can be connected to the LAN 1171 through a network interface or adapter. When used in a WAN networking environment, the computer 1110 can typically include a communications component, such as a modem, or other means for establishing communications over the WAN, such as the Internet. A communications component, such as wireless communications component, a modem and so on, which can be internal or external, can be connected to the system bus 1121 via the user input interface of input 1140, or other appropriate mechanism. In a networked environment, program modules depicted relative to the computer 1110, or portions thereof, can be stored in a remote memory storage device. It will be appreciated that the network connections shown and described are exemplary and other means of establishing a communications link between the computers can be used.

Example Networking Environment

Figure 12:
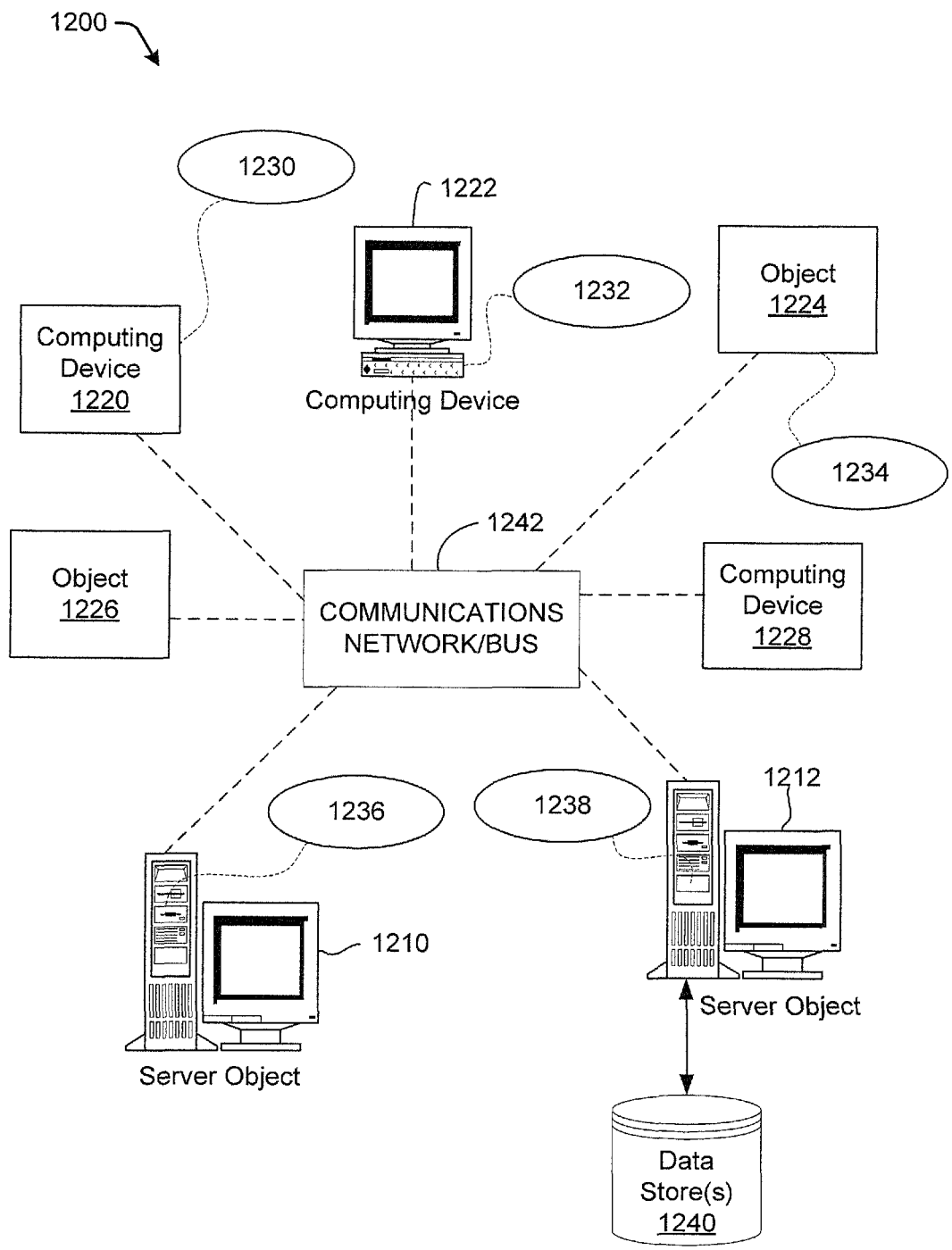
FIG. 12 depicts a block diagram of an example data communication network that can be operable in conjunction with various aspects described herein.

FIG. 12 provides a schematic diagram of an exemplary networked or distributed computing environment 1200. The distributed computing environment comprises computing objects 1210, 1212, etc. and computing objects or devices 1220, 1222, 1224, 1226, 1228, etc., which may include programs, methods, data stores, programmable logic, etc., as represented by applications 1230, 1232, 1234, 1236, 1238 and data store(s) 1240. It can be appreciated that computing objects 1210, 1212, etc. and computing objects or devices 1220, 1222, 1224, 1226, 1228, etc. may comprise different devices, including a multimedia display device or similar devices depicted within the illustrations, or other devices such as a mobile phone, personal digital assistant (PDA), audio/video device, MP3 players, personal computer, laptop, etc. It should be further appreciated that data store(s) 1240 can include one or more cache memories, one or more registers, or other similar data stores disclosed herein.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1242, either directly or indirectly. Even though illustrated as a single element in FIG. 12, communications network 1242 may comprise other computing objects and computing devices that provide services to the system of FIG. 12, and/or may represent multiple interconnected networks, which are not shown. Each computing object 1210, 1212, etc. or computing object or devices 1220, 1222, 1224, 1226, 1228, etc. can also contain an application, such as applications 1230, 1232, 1234, 1236, 1238, that might make use of an API, or other object, software, firmware and/or hardware, suitable for communication with or implementation of the techniques and disclosure described herein.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems automatic diagnostic data collection as described in various embodiments herein.

Thus, a host of network topologies and network infrastructures, such as client/server, peer-to-peer, or hybrid architectures, can be utilized. The "client" is a member of a class or group that uses the services of another class or group to which it is not related. A client can be a process, i.e., roughly a set of instructions or tasks, that requests a service provided by another program or process. The client process utilizes the requested service, in some cases without having to "know" any working details about the other program or the service itself.

In a client/server architecture, particularly a networked system, a client is usually a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc., acting as servers provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network 1242 or bus is the Internet, for example, the computing objects 1210, 1212, etc. can be Web servers with which other computing objects or devices 1220, 1222, 1224, 1226, 1228, etc. communicate via any of a number of known protocols, such as the hypertext transfer protocol (HTTP). Computing objects 1210, 1212, etc. acting as servers may also serve as clients, e.g., computing objects or devices 1220, 1222, 1224, 1226, 1228, etc., as may be characteristic of a distributed computing environment.

Reference throughout this specification to "one embodiment," "an embodiment," "an example," "an implementation," "a disclosed aspect," or "an aspect" means that a particular feature, structure, or characteristic described in connection with the embodiment, implementation, or aspect is included in at least one embodiment, implementation, or aspect of the present disclosure. Thus, the appearances of the phrase "in one embodiment," "in one example," "in one aspect," "in an implementation," or "in an embodiment," in various places throughout this specification are not necessarily all referring to the same embodiment. Furthermore, the particular features, structures, or characteristics may be combined in any suitable manner in various disclosed embodiments.

As utilized herein, terms "component," "system," "architecture," "engine" and the like are intended to refer to a computer or electronic-related entity, either hardware, a combination of hardware and software, software (e.g., in execution), or firmware. For example, a component can be one or more transistors, a memory cell, an arrangement of transistors or memory cells, a gate array, a programmable gate array, an application specific integrated circuit, a controller, a processor, a process running on the processor, an object, executable, program or application accessing or interfacing with semiconductor memory, a computer, or the like, or a suitable combination thereof. The component can include erasable programming (e.g., process instructions at least in part stored in erasable memory) or hard programming (e.g., process instructions burned into non-erasable memory at manufacture).

By way of illustration, both a process executed from memory and the processor can be a component. As another example, an architecture can include an arrangement of electronic hardware (e.g., parallel or serial transistors), processing instructions and a processor, which implement the processing instructions in a manner suitable to the arrangement of electronic hardware. In addition, an architecture can include a single component (e.g., a transistor, a gate array, . . . ) or an arrangement of components (e.g., a series or parallel arrangement of transistors, a gate array connected with program circuitry, power leads, electrical ground, input signal lines and output signal lines, and so on). A system can include one or more components as well as one or more architectures. One example system can include a switching block architecture comprising crossed input/output lines and pass gate transistors, as well as power source(s), signal generator(s), communication bus(ses), controllers, I/O interface, address registers, and so on. It is to be appreciated that some overlap in definitions is anticipated, and an architecture or a system can be a stand-alone component, or a component of another architecture, system, etc.

In addition to the foregoing, the disclosed subject matter can be implemented as a method, apparatus, or article of manufacture using typical manufacturing, programming or engineering techniques to produce hardware, firmware, software, or any suitable combination thereof to control an electronic device to implement the disclosed subject matter. The terms "apparatus" and "article of manufacture" where used herein are intended to encompass an electronic device, a semiconductor device, a computer, or a computer program accessible from any computer-readable device, carrier, or media. Computer-readable media can include hardware media, or software media. In addition, the media can include non-transitory media, or transport media. In one example, non-transitory media can include computer readable hardware media. Specific examples of computer readable hardware media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Computer-readable transport media can include carrier waves, or the like. Of course, those skilled in the art will recognize many modifications can be made to this configuration without departing from the scope or spirit of the disclosed subject matter.

What has been described above includes examples of the disclosed subject matter. It is, of course, not possible to describe every conceivable combination of components or methodologies for purposes of describing the disclosed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the disclosure. Furthermore, to the extent that a term "includes", "including", "has" or "having" and variants thereof is used in either the detailed description or the claims, such term is intended to be inclusive in a manner similar to the term "comprising" as "comprising" is interpreted when employed as a transitional word in a claim.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Additionally, some portions of the detailed description have been presented in terms of algorithms or process operations on data bits within electronic memory. These process descriptions or representations are mechanisms employed by those cognizant in the art to effectively convey the substance of their work to others equally skilled. A process is here, generally, conceived to be a self-consistent sequence of acts leading to a desired result. The acts are those requiring physical manipulations of physical quantities. Typically, though not necessarily, these quantities take the form of electrical and/or magnetic signals capable of being stored, transferred, combined, compared, and/or otherwise manipulated.

It has proven convenient, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise or apparent from the foregoing discussion, it is appreciated that throughout the disclosed subject matter, discussions utilizing terms such as processing, computing, calculating, determining, or displaying, and the like, refer to the action and processes of processing systems, and/or similar consumer or industrial electronic devices or machines, that manipulate or transform data represented as physical (electrical and/or electronic) quantities within the registers or memories of the electronic device(s), into other data similarly represented as physical quantities within the machine and/or computer system memories or registers or other such information storage, transmission and/or display devices.

In regard to the various functions performed by the above described components, architectures, circuits, processes and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In addition, while a particular feature may have been disclosed with respect to only one of several implementations, such feature may be combined with one or more other features of the other implementations as may be desired and advantageous for any given or particular application. It will also be recognized that the embodiments include a system as well as a computer-readable medium having computer-executable instructions for performing the acts and/or events of the various processes.

What is claimed is:

1. A system for analyzing process variation for design timing optimization, comprising:
   a memory to store executable components; and
   a processor, coupled to the memory, that facilitates execution of the executable components, the executable components comprising:
   a characterizer component that identifies, from a set of cells, a subset of representative cells that comprises a plurality of respective representative cells, each respective representative cell of the plurality of respective representative cells representative of a different respective subset of other cells of the set of cells, and characterizes the subset of representative cells based at least in part on defined design criteria relating to cell characteristics, wherein at least a portion of the set of cells is associated with a design of an integrated circuit;

a mapper component that maps respective sets of cell-related information associated with each respective cell of the respective representative cells to its respective subset of other cells of the set of cells to facilitate characterization of the respective subsets of other cells according to the characterization of the respective representative cells; and a constructor component that reconstructs the design of the integrated circuit based at least in part on the cell-related information associated with the respective representative cells, design-related information associated with the respective representative cells, and at least the portion of the set of cells.

2. The system of claim 1, wherein the characterizer component identifies a cell of the set of cells to be a representative cell to be included in the subset of representative cells based at least in part on the cell characteristics comprising at least one of a cell height, a channel width, a voltage-threshold doping, or a stack height, associated with the cell.

3. The system of claim 1, wherein the characterizer component performs an analysis of the respective representative cells and generates a variation profile based at least in part on results of the analysis of the respective representative cells.

4. The system of claim 1, wherein the characterizer component characterizes the respective representative cells based at least in part on the defined design criteria, the defined design criteria comprising defined construction criteria and defined simulation criteria, wherein the defined construction criteria relates to at least one of an input transition rate, an output loading, or a related transition rate, respectively associated with the respective representative cells, and wherein the defined simulation criteria relates to at least one of a process, a voltage, or a temperature, respectively associated with the respective representative cells.

5. The system of claim 4, wherein the characterizer component simulates operation of a representative cell of the subset of representative cells to generate simulation results comprising at least one of a mean of a delay, a standard deviation of the delay, a mean amount of an output transition rate, and a standard deviation of the output transition rate, associated with the representative cell; and the characterizer component performs an analysis of the simulation results, based at least in part on a ratio of the standard deviation of the delay to the mean of the delay, and a ratio of the standard deviation of the delay to an operating clock period, associated with the representative cell, and generates at least a portion of the cell-related information and design-related information based at least in part on results of the analysis of the simulation results.

6. The system of claim 1, wherein the characterizer component respectively categorizes the respective representative cells as being a general usage cell, a limited usage cell, or an unusable cell based at least in part on the cell-related information.

7. The system of claim 6, wherein usage of the limited usage cell in the design of the integrated circuit is subject to the limited usage cell being determined to satisfy a set of conditions; and the set of conditions comprise at least one of a mean delay or a transition rate, associated with the limited usage cell.

8. The system of claim 6, wherein the characterizer component generates a cell library component comprising at least one of categorization information that categorizes the respective representative cells, the cell-related information associated with the respective representative cells, or mapping information related to a mapping of the respective representative cells respectively to the subsets of other cells.

9. The system of claim 1, wherein the constructor component analyzes timing results associated with the reconstruction of the design of the integrated circuit, based at least in part on a subset of limited usage cells in at least the portion of the set of cells used in the reconstruction of the design of the integrated circuit, wherein the subset of limited usage cells is subject to a set of conditions relating to at least one of a mean delay or a transition rate, respectively associated with limited usage cells of the subset of limited usage cells, wherein, in response to determining that a limited usage cell of the subset of limited usage cells is not in compliance with the set of conditions, the constructor component weighs an overall path associated with the limited usage cell, and adjusts a tier value associated with the overall path based at least in part on a path slack associated with the overall path.

10. The system of claim 1, wherein the constructor component analyzes timing results associated with the reconstruction of the design of the integrated circuit, based at least in part on a subset of limited usage cells in at least the portion of the set of cells used in the reconstruction of the design of the integrated circuit, wherein the subset of limited usage cells is subject to a set of conditions relating to at least one of a mean delay or a transition rate, respectively associated with limited usage cells of the subset of limited usage cells, wherein, in response to determining that a limited usage cell of the subset of limited usage cells is not in compliance with the set of conditions, the constructor component determines whether the limited usage cell is associated with a tier that has a defined level of criticality, in accordance with the defined design criteria, and, in response to determining that the limited usage cell is associated with the tier, modifies the limited usage cell to enhance performance of the limited usage cell to reduce a variation sensitivity of the limited usage cell.

11. A method of analyzing process variation for design timing optimization, comprising:
    identifying, by a system comprising a processor, a subset of cells of a set of cells as a plurality of representative cells, wherein each representative cell of the plurality of representative cells respectively represents a different subset of other cells of the set of cells based at least in part on defined design criteria relating to cell attributes, wherein at least a portion of the set of cells is associated with an integrated circuit design;
    characterizing, by the system, each representative cell of the plurality of representative cells of the subset of cells, based at least in part on the defined design criteria;
    mapping, by the system, respective sets of cell-related data associated with each representative cell of the plurality of representative cells to its respective subset of other cells of the set of cells, wherein the respective sets of cell-related data comprises respective characterization data associated with respective characterization of each of the representative cells based at least in part on the characterizing, and wherein the characterizing comprises respectively characterizing the subsets of other cells to correspond to the respective characterization of the representative cells based at least in part on the mapping; and constructing, by the system, the integrated circuit design based at least in part on the respective sets of the cell-related data associated with the representative cells, design-related data associated with the representative cells, and at least the portion of the set of cells.

12. The method of claim 11, wherein the identifying the subset of cells further comprises identifying a cell of the set of cells to be a representative cell to be included in the subset of cells, based at least in part on the cell attributes comprising at least one of a cell height, a channel width, a voltage-threshold doping, or a stack height, associated with the cell.

13. The method of claim 11, further comprising:
analyzing, by the system, the representative cells; and
generating, by the system, a variation profile associated with the representative cells based at least in part on results of the analyzing of the representative cells.

14. The method of claim 11, further comprising:
characterizing, by the system, the representative cells, based at least in part on defined construction criteria and defined simulation criteria, wherein the defined construction criteria relates to at least one of an input transition rate, an output loading, or a related transition rate, associated with the representative cells, and wherein the defined simulation criteria relates to at least one of a process, a voltage, or a temperature, associated with the representative cells;
simulating, by the system, operation of a representative cell of the subset of cells;
generating, by the system, simulation results based at least in part on the simulating, wherein the simulation results comprise at least one of a mean amount of a delay, a standard deviation of the delay, a mean amount of an output transition rate, and a standard deviation of the output transition rate, associated with the representative cell;
analyzing, by the system, the simulation results, based at least in part on a ratio of the standard deviation of the delay to the mean amount of the delay and a ratio of the standard deviation of the delay to an operating clock period, associated with the representative cell; and
generating, by the system, at least a subset of the cell-related data and a set of design-related data based at least in part on results of the analyzing of the simulation results.

15. The method of claim 11, further comprising:
classifying, by the system, the representative cells, respectively, as being a general usage cell, a conditional usage cell, or an unusable cell based at least in part on the cell-related data; and
determining, by the system, at least one parameter associated with a permissible use of the conditional usage cell in the integrated circuit design based at least in part on a set of conditions and the cell-related data, wherein the set of conditions comprise at least one of a mean delay or a transition rate, associated with the conditional usage cell.

16. The method of claim 11, further comprising:
classifying, by the system, the representative cells, respectively, as being a general usage cell, a conditional usage cell, or an unusable cell based at least in part on the cell-related data; and generating, by the system, a cell library component comprising at least one of classification data that classifies the representative cells, the cell-related data associated with the representative cells, or mapping data related to the mapping of the respective sets of the cell-related data associated with the representative cells to the subsets of other cells.

17. The method of claim 11, further comprising:
analyzing, by the system, timing results associated with the integrated circuit design, based at least in part on the constructing and a subset of conditional usage cells in at least the portion of the set of cells used in the constructing of the integrated circuit design, wherein use of the subset of conditional usage cells is conditioned based at least in part on a set of conditions relating to at least one of a mean delay or a transition rate, respectively associated with conditional usage cells of the subset of conditional usage cells;
in response to determining that a conditional usage cell of the subset of conditional usage cells does not satisfy the set of conditions,
weighing, by the system, an overall path associated with the conditional usage cell; and
modifying, by the system, a tier level associated with the overall path based at least in part on a path slack associated with the overall path.

18. The method of claim 11, further comprising:
analyzing, by the system, timing results associated with the integrated circuit design, based at least in part on the constructing and a subset of conditional usage cells in at least the portion of the set of cells used in the constructing of the integrated circuit design, wherein use of the subset of conditional usage cells is conditioned based at least in part on a set of conditions relating to at least one of a mean delay or a transition rate, respectively associated with conditional usage cells of the subset of conditional usage cells,
in response to determining that a conditional usage cell of the subset of conditional usage cells does not satisfy the set of conditions,
determining, by the system, whether the conditional usage cell is associated with a tier that has a defined level of criticality, in accordance with the defined design criteria; and
in response to determining that the conditional usage cell is associated with the tier, modifying, by the system, the conditional usage cell to improve performance of the conditional usage cell to reduce a variation sensitivity of the conditional usage cell.

19. A device for analyzing process variation for design timing optimization, comprising:
a memory to store executable components; and
a processor, coupled to the memory, that facilitates execution of the executable components, the executable components comprising:
a characterizer component that determines, from a set of cells, a subset of cells comprising a plurality of respective representative cells, each respective representative cell representative of a different respective subset of other cells of the set of cells, and characterizes the respective representative cells in accordance with defined design criteria relating to cell characteristics;
a mapper component that maps respective sets of cell-related information associated with each respective representative cells to its respective subset of other cells of the set of cells, wherein the characterizer component respectively characterizes the respective subsets of other cells based at least in part on respective characterization of the respective representative cells and the mapping of the respective sets of cell-related information associated with the respective representative cells to the respective subsets of other cells;

a cell library component that comprises at least one of categorization information that categorizes the representative cells, the cell-related information associated with the representative cells, or mapping information related to the mapping of the respective sets of cell-related information associated with the representative cells to the subsets of other cells; and a constructor component that reconstructs the design of the integrated circuit based at least in part on a portion of the cells in the cell library component, based at least in part on subsets of the categorization information respectively associated with the representative cells, the constructor component modifying a cell of the portion of the cells to enhance performance of the cell, based at least in part on an analysis result and a set of conditions associated with the cell, in accordance with the defined design criteria.

20. The device of claim 19, wherein the constructor component analyzes timing results associated with the reconstruction of the design of the integrated circuit, based at least in part on a subset of conditional usage cells in at least the portion of the cells used in the reconstruction of the design of the integrated circuit, wherein the subset of conditional usage cells, comprising the cell, is subject to a set of conditions relating to at least one of a mean delay or a transition rate, respectively associated with conditional usage cells of the subset of conditional usage cells.

* * * * *